(12) United States Patent
Matsuyama et al.

(10) Patent No.: US 7,677,809 B2
(45) Date of Patent: Mar. 16, 2010

(54) TAPERED ROLLER BEARING, A TAPERED ROLLER BEARING ASSEMBLY AND A PINION-SHAFT SUPPORTING ASSEMBLY USING THE SAME

(75) Inventors: Hiroki Matsuyama, Nara (JP); Hiroyuki Chiba, Kashiwara (JP); Masahiro Harada, Kashiwara (JP); Kazutoshi Toda, Tondabayashi (JP); Kiyoshi Ogino, Kashihara (JP); Koji Kawaguchi, Izumi (JP); Yuzuru Takahashi, Kashiwara (JP); Hirofumi Dodoro, Kashihara (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 564 days.

(21) Appl. No.: 11/578,044

(22) PCT Filed: Apr. 14, 2005

(86) PCT No.: PCT/JP2005/007260

§ 371 (c)(1),
(2), (4) Date: Mar. 20, 2007

(87) PCT Pub. No.: WO2005/100809

PCT Pub. Date: Oct. 27, 2005

(65) Prior Publication Data

US 2007/0230851 A1    Oct. 4, 2007

(30) Foreign Application Priority Data

Apr. 14, 2004 (JP) .............................. 2004-119283
Jul. 15, 2004 (JP) .............................. 2004-208265

(51) Int. Cl.
*F16C 33/36* (2006.01)
*F16C 33/58* (2006.01)

(52) U.S. Cl. ....................... 384/565; 384/571; 384/564; 384/450

(58) Field of Classification Search ................. 384/450, 384/564–565, 568, 571; 29/898.041, 898.066, 29/898.068
See application file for complete search history.

(56) References Cited

U.S. PATENT DOCUMENTS 1,736,037 A * 11/1929 Else ............................ 384/565

(Continued)

FOREIGN PATENT DOCUMENTS

JP         8-177851 A       7/1996

(Continued)

OTHER PUBLICATIONS

Microfilm of the specification and drawings annexed to the request of Japanese Utility Model Application No. 95081/1989 (Laid-open No. 12015/1991) Feb. 7, 1991.
CD-ROM of the specification and drawings annexed to the request of Japanese Utility Model Application No. 4121/1991 (Laid-open No. 95318/1992) Aug. 18, 1992).

*Primary Examiner*—Marcus Charles
(74) *Attorney, Agent, or Firm*—Birch, Stewart, Kolasch & Birch, LLP

(57) ABSTRACT

A tapered roller bearing is designed to have a roller loading ratio in the range of 0.7 to 0.92 and a ratio of roller length to roller diameter in the range of 1.1 to 1.7 whereby oil agitation loss and rolling viscous resistance are reduced for achieving the reduction of running torque. Crownings are provided which are designed to have an outer-ring crowning parameter (=RCO/LRO) in the range of 30 to 150 and an inner-ring crowning parameter (=RCI/LRI) in the range of 50 to 260, provided that RCO denotes the radius of an outer ring crowning, LRO denotes the raceway length of an outer ring, RCI denotes the radius of an inner ring crowning and LRI denotes the raceway length of an inner ring. Thus, the rolling viscous resistance is reduced for achieving the reduction of running torque.

13 Claims, 19 Drawing Sheets

U.S. PATENT DOCUMENTS

| | | | | |
|---|---|---|---|---|
| 4,877,340 A * | 10/1989 | Hoeprich | ............... | 384/571 |
| 5,007,747 A * | 4/1991 | Takeuchi et al. | ............ | 384/450 |
| 5,921,685 A * | 7/1999 | Ishimaru et al. | ............ | 384/564 |
| 6,086,261 A | 7/2000 | Nakagawa et al. | | |
| 6,390,685 B1 | 5/2002 | Shimomura et al. | | |
| 6,447,168 B2 * | 9/2002 | Tsujimoto et al. | ........... | 384/571 |
| 6,464,398 B2 * | 10/2002 | Takehara et al. | ............ | 384/564 |
| 6,502,996 B2 * | 1/2003 | Joki | ......................... | 384/571 |
| 7,090,405 B2 * | 8/2006 | Tsujimoto et al. | ........... | 384/564 |
| 7,435,008 B2 * | 10/2008 | Kawaguchi | ............... | 384/571 |

| | | | |
|---|---|---|---|
| 2004/0017957 A1 | 1/2004 | Matsuyama et al. | |

FOREIGN PATENT DOCUMENTS

| | | | | |
|---|---|---|---|---|
| JP | 11-210765 A | | | 8/1999 |
| JP | 2000161348 A | * | | 6/2000 |
| JP | 2001-65574 A | | | 3/2001 |
| JP | 2003097567 A | * | | 4/2003 |
| JP | 2003-130059 A | | | 5/2003 |
| JP | 2003-343552 A | | | 12/2003 |

* cited by examiner

TAPERED ROLLER BEARING, A TAPERED ROLLER BEARING ASSEMBLY AND A PINION-SHAFT SUPPORTING ASSEMBLY USING THE SAME

TECHNICAL FIELD

The present invention relates to a tapered roller bearing for use in a differential gear assembly or the like of automotive vehicles and industrial machines.

BACKGROUND ART

The tapered roller bearing has higher load carrying capacity and higher rigidity than a ball bearing. Therefore, the tapered roller bearing is used in a vehicular pinion-shaft supporting assembly such as an automotive differential gear assembly or a transaxle assembly. However, the tapered roller bearing also suffers a drawback of having a great running torque (loss). In this connection, proposals have been made to reduce rolling friction by forming crownings on raceways of inner and outer rings or on rolling contact surfaces of tapered rollers (see, for example, Japanese Unexamined Patent Publications No.2003-130059 and No.2001-65574).

The above prior-art examples are designed to improve the performance of the tapered roller bearing by defining the configuration of the crowning on the raceway or on the rolling contact surface. However, the crowning has never been approached from the viewpoint of quantity. Hence, no attempt has been made to reduce the running torque of the tapered roller bearing by defining the quantity or the like of the crowning. On the other hand, rolling viscous resistance of the tapered rollers and oil agitation loss constitute major factors of the great running torque of the tapered roller bearing such as mounted in the differential gear assembly or the like. However, a guideline for reducing these resistances has not been defined.

DISCLOSURE OF THE INVENTION

In view of the foregoing, it is an object of the invention to effectively reduce the running torque of the tapered roller bearing by taking multiple factors into considerations.

According to the present invention, a tapered roller bearing comprises: an outer ring; an inner ring; a plurality of tapered rollers interposed between these rings; and a retainer for retaining the tapered rollers, and is characterized in that a roller loading ratio represented by $z \cdot DW/(\pi \cdot dm)$ is in a range of 0.7 to 0.92, and a ratio of roller length to roller diameter as represented by LWR/DW is in a range of 1.1 to 1.7, provided that z denotes a number of rollers, LWR denotes an effective length of the roller, DW denotes a mean diameter of the roller and dm denotes a Pitch Circle Diameter (PCD) of the roller, and wherein an outer-ring crowning parameter (=RCO/LRO) is in a range of 30 to 150, and an inner-ring crowning parameter (=RCI/LRI) is in a range of 50 to 260, provided that RCO denotes a radius of an outer-ring crowning, LRO denotes a raceway length of the outer ring, RCI denotes a radius of an inner-ring crowning, and LRI denotes a raceway length of the inner ring.

In such a tapered roller bearing, the oil agitation loss and the rolling viscous resistance may be reduced by reducing the roller-length/roller-diameter ratio with the roller loading ratio maintained in the small numerical range. Furthermore, the rolling viscous resistance may be reduced by setting the above crowning parameters in the aforementioned ranges. Thus, the running torque may be reduced effectively.

According to another aspect of the invention, a tapered roller bearing comprises: an outer ring; an inner ring; a plurality of tapered rollers interposed between these rings; and a retainer for retaining the tapered rollers, wherein a roller loading ratio represented by $z \cdot DW/(\pi \cdot dm)$ is in the range of 0.7 to 0.92 whereas a ratio of roller length to roller diameter as represented by LWR/DW is in the range of 1.1 to 1.7, provided that z denotes the number of rollers, LWR denotes the effective length of the roller, DW denotes the mean diameter of the roller and dm denotes the Pitch Circle Diameter of the roller, and wherein raceways of the outer ring and the inner ring and a rolling contact surface of the tapered roller are each provided with a crowning;

a total crowning amount (=an outer-ring crowning amount+an inner-ring crowning amount+a roller crowning amount×2) is 50 μm or more;

an outer-ring crowning rate (=the outer-ring crowning amount/the total crowning amount) is 40% or more; and a roller crowning rate (=(the roller crowning amount×2)/the total crowning amount) is 20% or less.

In such a tapered roller bearing, the oil agitation loss and the rolling viscous resistance may be reduced by reducing the roller-length/roller diameter ratio with the roller loading ratio maintained in the small numerical range. Furthermore, the rolling viscous resistance may be reduced by setting the above crowning parameters in the aforementioned ranges.

In the above tapered roller bearing, a roller diameter parameter (2DW/(D−d)) may be in a range of 0.44 to 0.52, provided that d denotes a bore diameter of the inner ring, and D denotes an outside diameter of the outer ring.

In this case, the bearing has a greater roller diameter than that of a conventional product of the same size. Accordingly, a free space within the bearing is increased in volume to facilitate the oil flow through the bearing, so that the oil agitation loss is reduced.

A tapered roller bearing assembly may comprise oil inflow restricting means for restricting the inflow of oil, the restricting means being provided at an axial one end of space between the inner ring and the outer ring of the above tapered roller bearing. The oil inflow restricting means may comprise a labyrinth seal defined between the inner ring and an annular portion which is formed at an end of a small diameter portion of the retainer as extended radially inwardly from place adjacent to the outer ring and which adjoins the inner ring at an inside circumferential end thereof. The tapered roller bearing assembly may have an alternative constitution wherein an additional member not constituting the tapered roller bearing is provided as the oil inflow restricting means. For example, the labyrinth seal may be provided in a bearing housing.

In this case, the oil inflow into the bearing is restricted, so that the rolling viscous resistance and the oil agitation loss are reduced. In this manner, the running torque is reduced.

In the above tapered roller bearing, a contact angle of the outer ring may be in a range of 25° to 30°.

In this case, the bearing is increased in a pumping action to promote the oil discharge, so that the oil agitation loss is reduced. Thus is reduced the running torque.

In the above tapered roller bearing, an inner-ring crowning rate (=the inner-ring crowning amount/the total crowning amount) may be 10% or more.

In this case, the bearing may be reduced in contact load on areas of axially opposite ends of a contact surface between the inner raceway and the rolling contact surface. In the event of a so-called edge load, as well, the bearing is adapted to reduce the action of the edge load, so that the bearing may be prevented from suffering the decrease of service life.

According to the invention, a vehicular pinion-shaft supporting assembly comprises tapered roller bearings disposed on a pinion-gear side of a pinion-shaft and on the opposite side therefrom, and is characterized in that a tapered roller baring disposed on the pinion-gear side is the tapered roller bearing assembly including the oil inflow restricting means.

In such a vehicular pinion-shaft supporting assembly, the inflow of oil into the head-side tapered roller bearing, which is susceptible to the oil inflow, may be restricted by way of the oil inflow restricting means (such as the labyrinth seal). Hence, the running torque may be reduced.

BEST MODES FOR CARRYING OUT THE INVENTION

Figure 19:
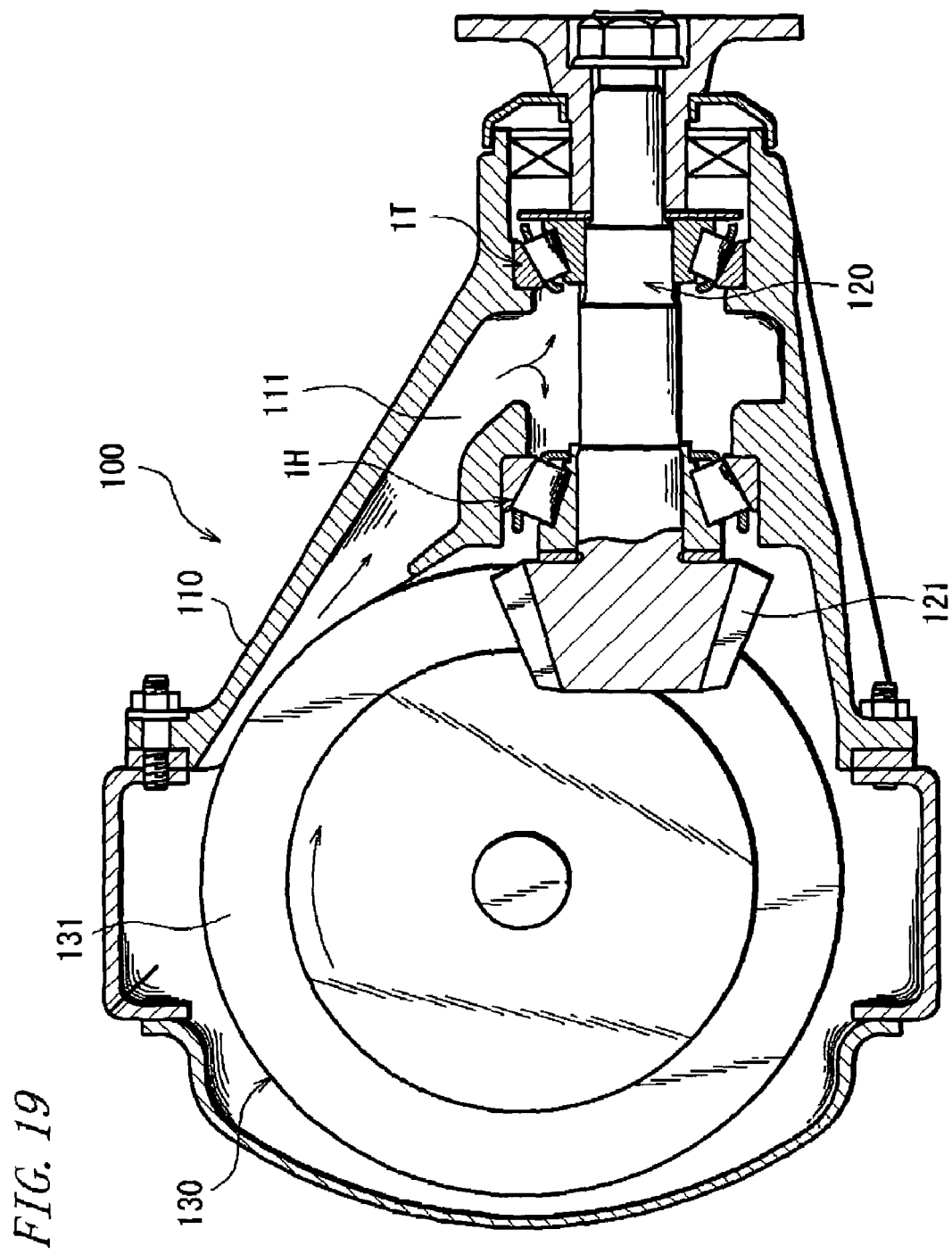
FIG. 19 is a sectional view showing a differential gear assembly.

Next, description is made on preferred embodiments of the invention with reference to the accompanying drawings. FIG. 19 is a sectional view showing an automotive differential gear assembly 100 which is used as a vehicular pinion-shaft support assembly employing a tapered roller bearing according to an embodiment of the invention. The differential gear assembly 100 includes a pinion-shaft 120 driven into rotation by an unillustrated drive shaft and a differential transmission mechanism 130, the pinion-shaft and the differential transmission mechanism accommodated in a case 110. A pinion-gear 121 is disposed at a distal end of the pinion-shaft 120 and is meshed with a ring gear 131 of the differential transmission mechanism 130. The pinion-shaft 120 is rotatably supported relative to the case 110 by means of a tapered roller bearing 1H on a pinion-gear side 121 (hereinafter, referred to as "head side") and a tapered roller bearing 1T on the opposite side therefrom (hereinafter, referred to as "tail side"). The case 110 is formed with a lubricating oil feeding path 111 between the pair of tapered roller bearings 1H, 1T such as to introduce a lubricating oil as indicated by arrows in the figure for lubricating raceways of the bearings.

Now, description is made on a lubricating operation of the above differential gear assembly 100. A lubricating oil (not shown) is stored in a bottom of the case 110 for lubricating the overall interior of the differential gear assembly 100. The ring gear 131 of the differential transmission mechanism 130 is driven into rotation in a direction of an arrow in the figure when a vehicle is driven into forward movement. The lubricating oil stored in the bottom of the case 110 is lifted upward by way of the rotation of the ring gear 131. The lubricating oil so lifted is guided through the lubricating oil feeding path 111 to space between the pair of tapered roller bearings 1H, 1T. Thus, the lubricating oil is fed into the bearings. The lubricating oil flowing through the head-side tapered roller bearing 1H is returned to the bottom of the case 110. The lubricating oil flowing through the tail-side tapered roller bearing 1T is returned to the bottom of the case 110 via an unillustrated return path. In this manner, the lubricating oil is circulated in the interior of the differential gear assembly 100.

Figure 1:
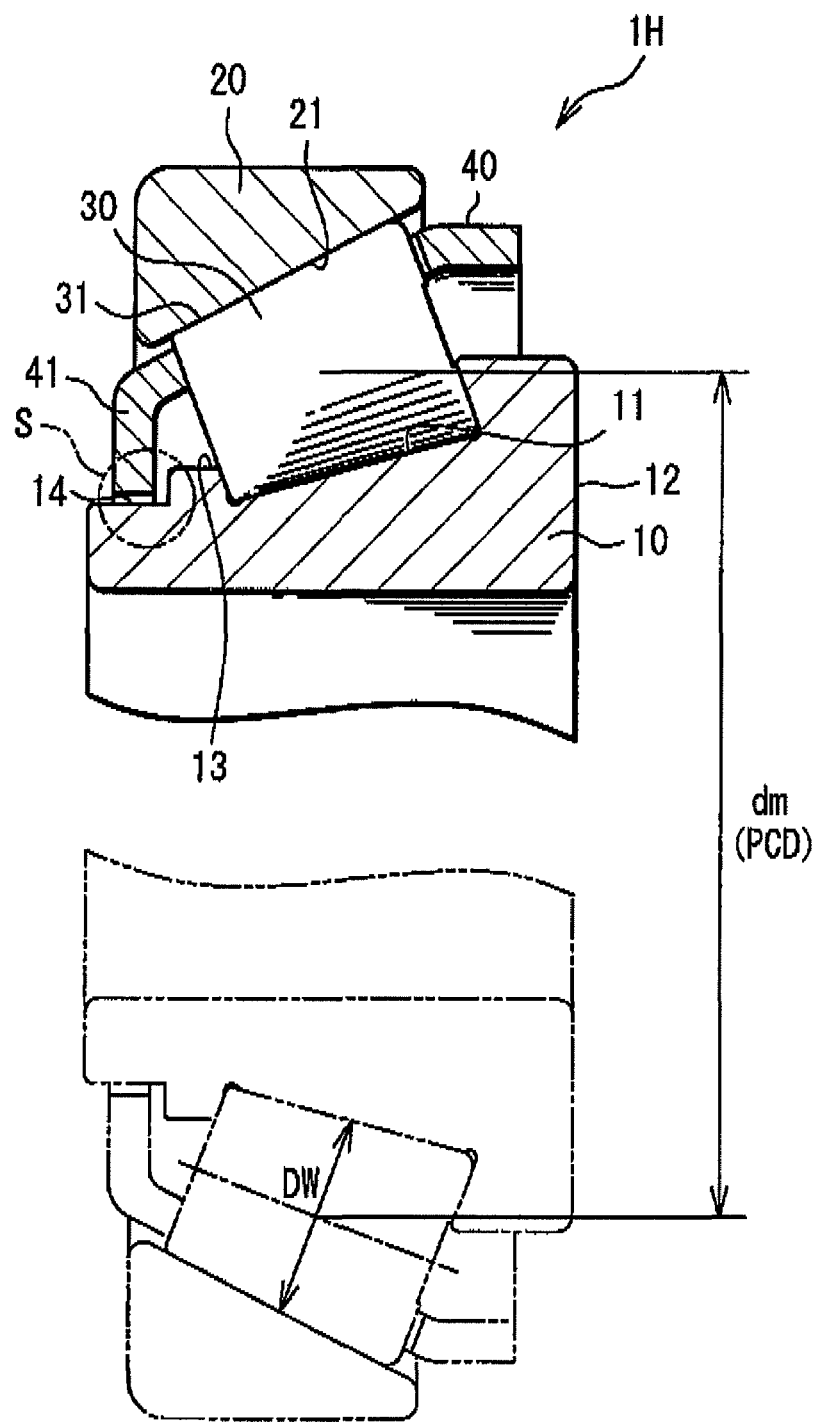
FIG. 1 is an axial sectional view of a head-side tapered roller bearing according to one embodiment of the invention.
Figure 2:
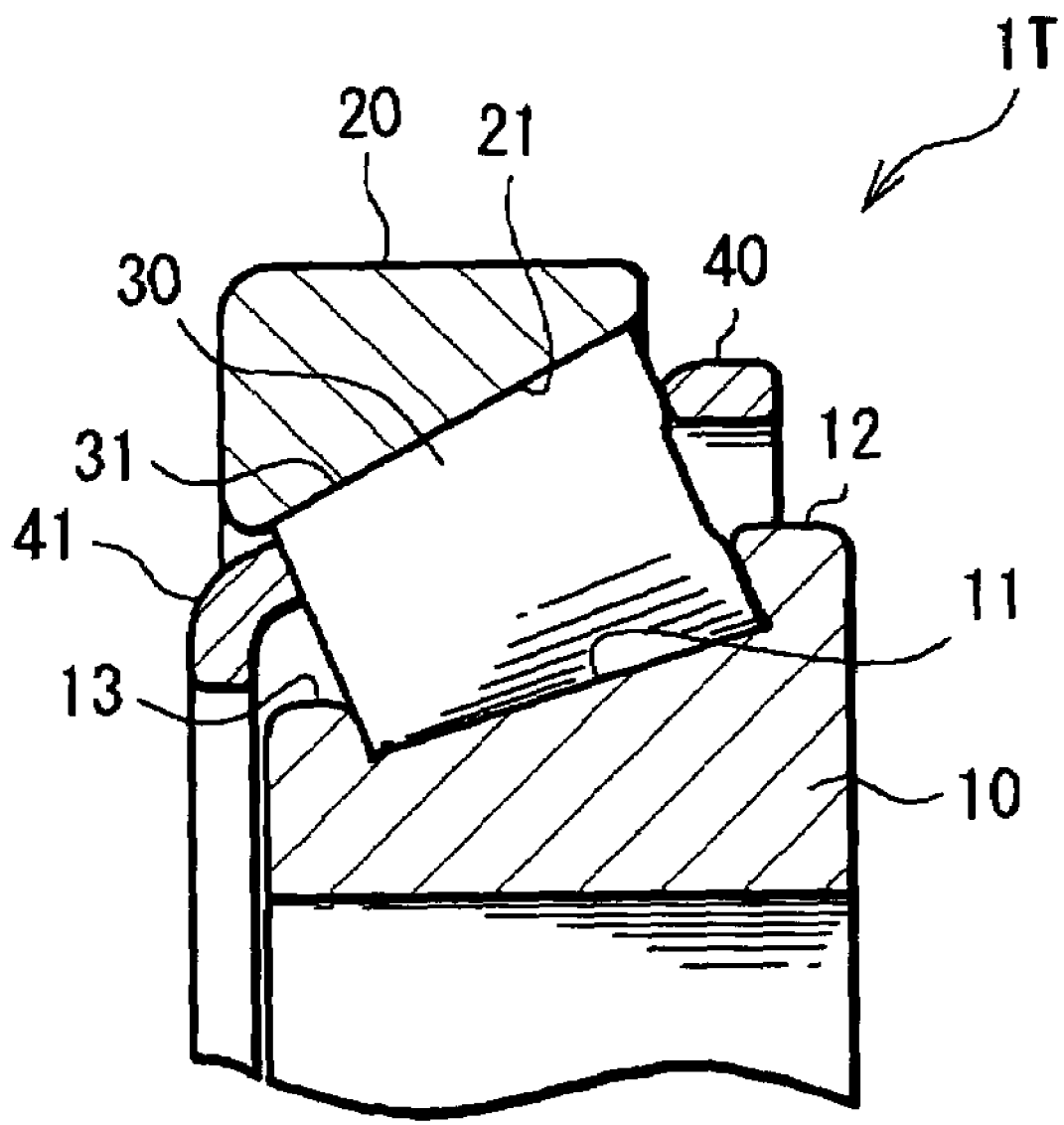
FIG. 2 is an axial sectional view of a tail-side tapered roller bearing according to the one embodiment of the invention.

FIG. 1 and FIG. 2 are axial sectional views showing the head-side tapered roller bearing 1H and the tail-side tapered roller bearing 1T, respectively. Referring to the individual figures, each of the tapered roller bearings 1H, 1T includes: an inner ring 10 formed with an inner raceway 11 in an outer periphery thereof, the inner raceway being defined by a circular conical surface; an outer ring 20 formed with an outer raceway 21 in an inner periphery thereof, the outer raceway being defined by a circular conical surface; a plurality of tapered rollers 30 rollably interposed between the inner and outer rings and each formed with a rolling contact surface on an outer periphery thereof, the rolling contact surface being defined by a circular conical surface; and a retainer 40 for circumferentially retaining these tapered rollers 30 at predetermined space intervals.

In each of the tapered roller bearings 1H, 1T, the inner ring 10 is formed with a great rib 12 and a small rib 13 on a great diameter side thereof (the right-hand side as seen in the figure) and on a small diameter side thereof (the left-hand side as seen in the figure), respectively. The great rib and the small rib serve to restrict an axial movement of the tapered rollers 30. The head-side tapered roller bearing 1H shown in FIG. 1 is also formed with a cylindrical portion 14 which is extended from the small rib 13 to a left end of the inner ring 10 and has a smaller outside diameter than that of the small rib 13. On the other hand, the retainer 40 is formed with an annular portion 41 at an end on a small diameter side thereof (the left-hand side as seen in the figure), the annular portion extended radially inwardly from place adjacent to the outer ring. An inside circumferential end of the annular portion 41 is in adjoining relation with an outer periphery of the cylindrical portion 14 of the inner ring 10 and with a side surface of the small rib 13 of the inner ring, whereby a labyrinth seal S is formed. In this manner, the labyrinth seal S is formed between the retainer 40 and the inner ring 10, so that the lubricating oil is prevented from flowing into the bearing from the left-hand side as seen in the figure. It is noted that the tail-side tapered roller bearing 1T is not provided with such a labyrinth seal.

If the aforesaid labyrinth seal S is not provided in the head-side tapered roller bearing 1H, a large quantity of lubricating oil is fed through a front side of the bearing 1H (the left-hand side of the tapered roller bearing 1H shown in FIG. 19) and through a back side thereof (the right-hand side as seen in the figure). Hence, the head-side tapered roller bearing 1H receives a larger quantity of oil inflow than the tail-side tapered roller bearing 1T. Accordingly, the head-side tapered roller bearing 1H is increased in the oil agitation loss. On the other hand, the tail-side tapered roller bearing 1T is supplied with less lubricating oil at cold engine start, so that the bearing is prone to seizing.

On this account, the head-side tapered roller bearing 1H is provided with the aforesaid labyrinth seal S for restricting the oil inflow therein, so that the tapered roller bearing 1H is reduced in the oil agitation loss. In the meantime, some of the lubricating oil to be allowed to flow into the head-side tapered roller bearing 1H without the labyrinth seal S is supplied to the tail-side tapered roller bearing 1T. Thus, the lubrication of the tail-side tapered roller bearing 1T is improved so that the bearing is less prone to seizing. In a case where the tail-side tapered roller bearing 1T is supplied with an excessive quantity of lubricating oil, a suitable labyrinth seal may also be provided in the tapered roller bearing 1T.

Next, description is made on a specific design guideline.

An effective way to reduce the running torque of the tapered roller bearings 1H, 1T is to reduce the oil agitation loss and the rolling viscous resistance. Firstly, the oil agitation loss may be reduced by quickly discharging the lubricating oil flown into the bearing. Therefore, means for promoting oil outflow may be provided. Specifically, a roller loading ratio is decreased to provide an increased circumferential gap between the tapered rollers. However, the decrease of the roller loading ratio leads to the decrease of the load carrying capacity. To compensate for this drawback, the tapered roller is increased in the diameter (mean diameter). In addition, the tapered roller is decreased in the area of contact with the lubricating oil by reducing the length thereof. Furthermore, the bearing may be enhanced in a pumping action by increasing a contact angle of the outer ring. On the other hand, the restriction of the oil inflow itself is thought to contribute to the reduction of the oil agitation loss. Therefore, the labyrinth seal S as inflow restricting means may be provided at least in the head-side tapered roller bearing 1H, as described above.

The decreased roller loading ratio and the configuration of the roller increased in the diameter but decreased in the length (or the thick, short roller configuration) lead to the reduction of the area of rolling contact surface and hence, the rolling viscous resistance is reduced. Furthermore, the rolling viscous resistance may also be reduced by providing the crowning on the raceway or the rolling contact surface.

While the differential gear assembly has been described as one example of the vehicular pinion-shaft supporting assembly, a transaxle assembly similarly serving to support the pinion-shaft may be constituted the same way.

Figure 3:
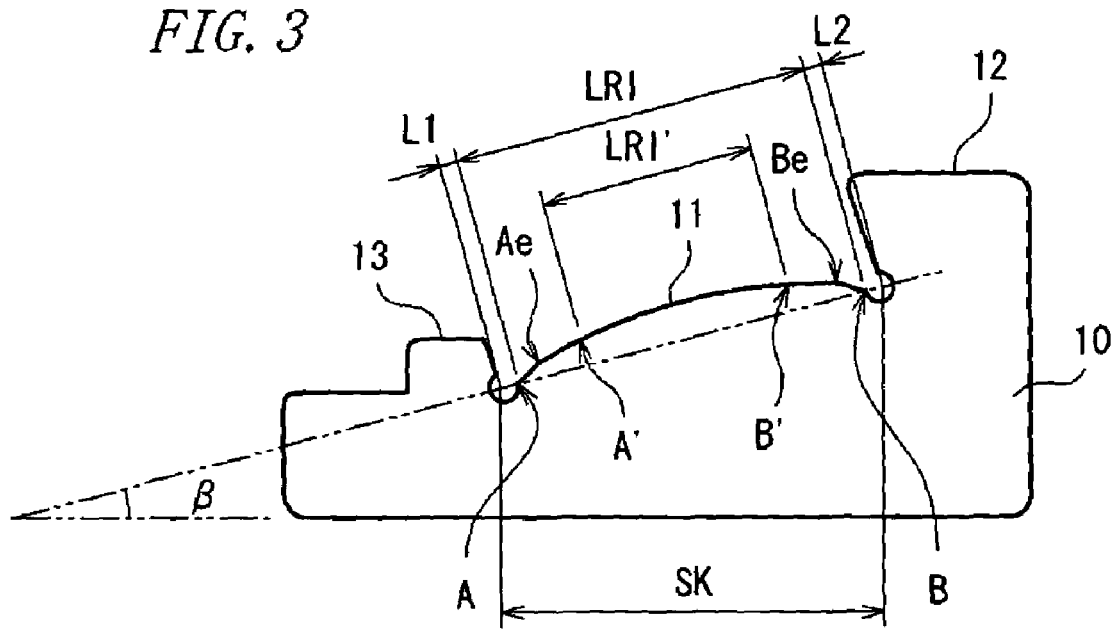
FIG. 3 is a diagram showing a contour of an inner ring and a configuration of a crowning (composite crowning)

A concept of the general crowning is described by way of example of the inner ring. FIG. 3 depicts a contour of an axial section of the inner ring 10 having a crowning provided on the inner raceway 11, the crowning shown in an exaggerated form. The inner raceway 11 in rolling contact with the rolling contact surface 31 (FIG. 1, FIG. 2) of the tapered roller 30 (FIG. 1, FIG. 2) is formed with a crowning slightly projected radially outwardly. The crowning is a composite crowning having a substantial trapezoidal shape, an upper side of which is defined by an arc.

A method of calculating a quantity of the crowning on the inner ring 10 (hereinafter, also referred to as the inner-ring crowning amount) is described as below. In FIG. 3, SK denotes the width of the inner raceway 11 with respect to an axial direction of the inner ring 10; β denotes the taper angle of the inner raceway 11; and L1, L2 denote the dimensions of chamfers formed at the opposite ends of the inner raceway 11. The length LRI of the raceway is calculated based on the following equation (1):

$$LRI = SK/\cos\beta - (L1 + L2) \qquad (1)$$

A length LRI' defined by LRI'=0.6LRI is taken in a manner to extend in opposite directions from a midpoint of the raceway length LRI as shown in the figure, whereas points located on the inner raceway 11 in correspondence to the opposite ends of the length LRI' are defined as points A' and B'. In this case, the points A', B' are located inwardly of end points "Ae", "Be" of the arc. However, the points A', B' may also coincide with the respective end points "Ae", "Be" of the arc.

Figure 4:
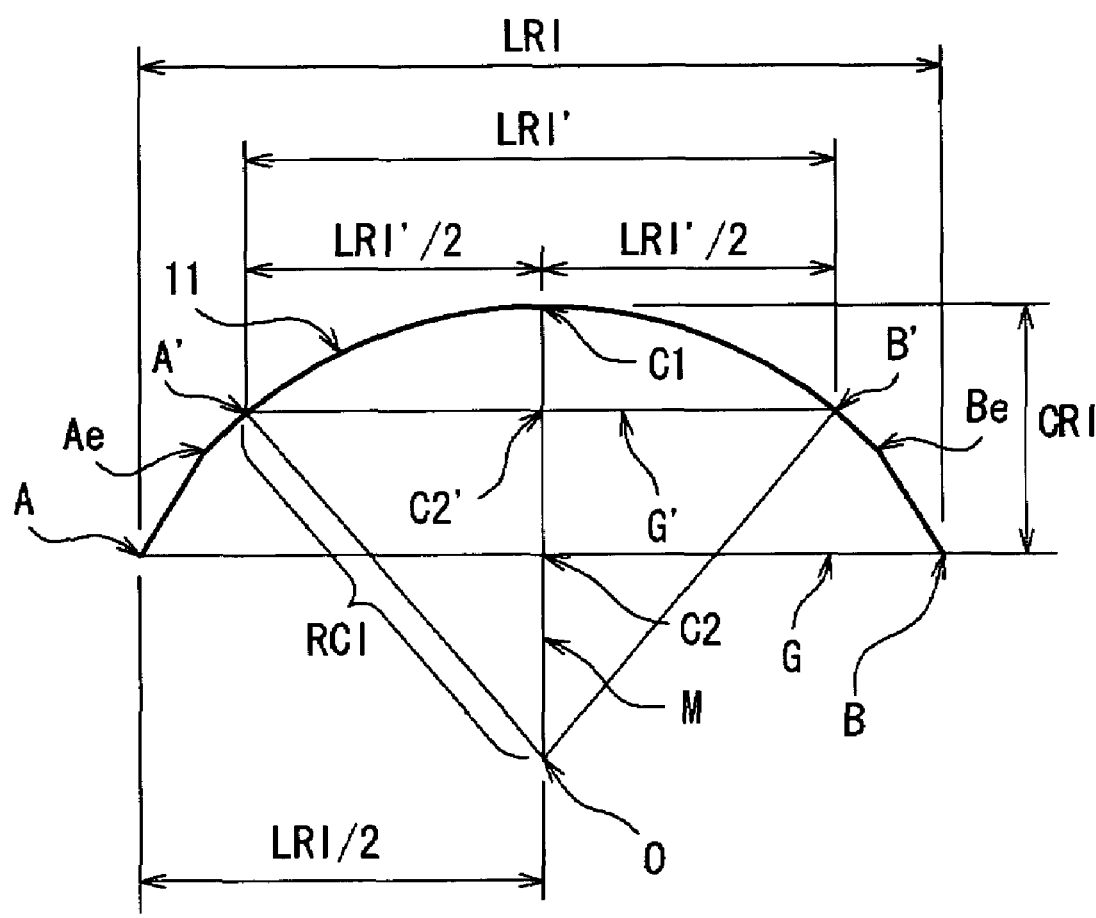
FIG. 4 is a diagram schematically showing the configuration of the crowning (composite crowning) provided on a raceway of the inner ring.

FIG. 4 schematically shows a sectional shape of the crowning formed between an end point A and an end point B of the raceway length LRI of the inner raceway 11 shown in FIG. 3. Referring to FIG. 4, a straight line M passing through a midpoint C2' of a chord G' of a crowning with respect to the length LRI' and through a center point O of the crowning arc intersects perpendicularly to the chord G' and passes through a center point C1 of the crowning arc with respect to the length LRI'. A distance from the center point C1 of the crowning arc to a midpoint C2 of a chord G of a crowning arc with respect to the raceway length LRI is defined as the inner-ring crowning amount CRI.

The configuration of the inner-ring crowning may include not only the substantial trapezoidal shape having the arcuate upper side, as shown in FIG. 4, but also other various shapes such as a shape defined by a single arc, a shape defined by plural arcs, a logarithmic crowning shape and an elliptical crowning shape. The aforementioned concept of the crowning amount is applicable to all these crowning configurations.

In addition, the aforementioned concept of the crowning and the definition of the crowning amount may be similarly applied to the roller and the outer ring.

It is noted that a crowning composed of a combination of plural shapes formed in the range of the raceway length (the length of the rolling contact surface) is referred to as composite crowning, whereas a crowning composed of a single arcuate shape formed in the range of the raceway length is referred to as full crowning.

Next, description is made on a concept of the full crowning and a concept of a crowning amount based on the above concept.

Figure 5:
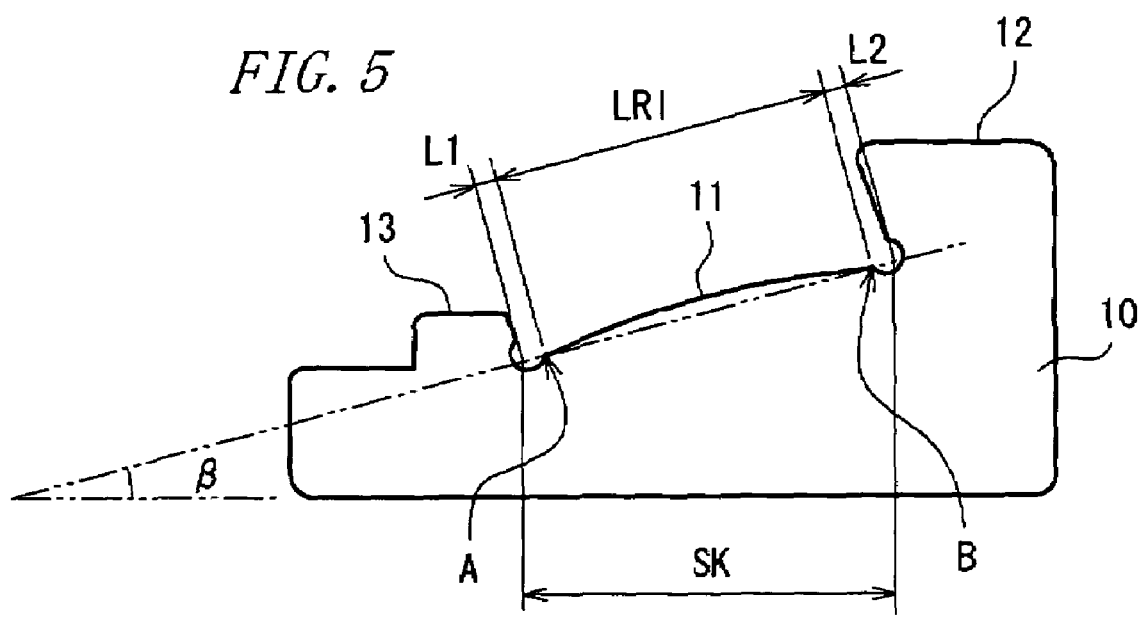
FIG. 5 is a diagram showing a contour of an inner ring and a configuration of a crowning (full crowning)

FIG. 5 depicts a contour of an axial section of the inner ring 10 having a full crowning provided on the inner raceway 11, the crowning shown in an exaggerated form. Referring to the figure, the raceway length LRI is determined based on the same equation (1) as that used for determining the raceway length shown in FIG. 3:

$$LRI = SK/\cos \beta - (L1+L2).$$

Figure 6:
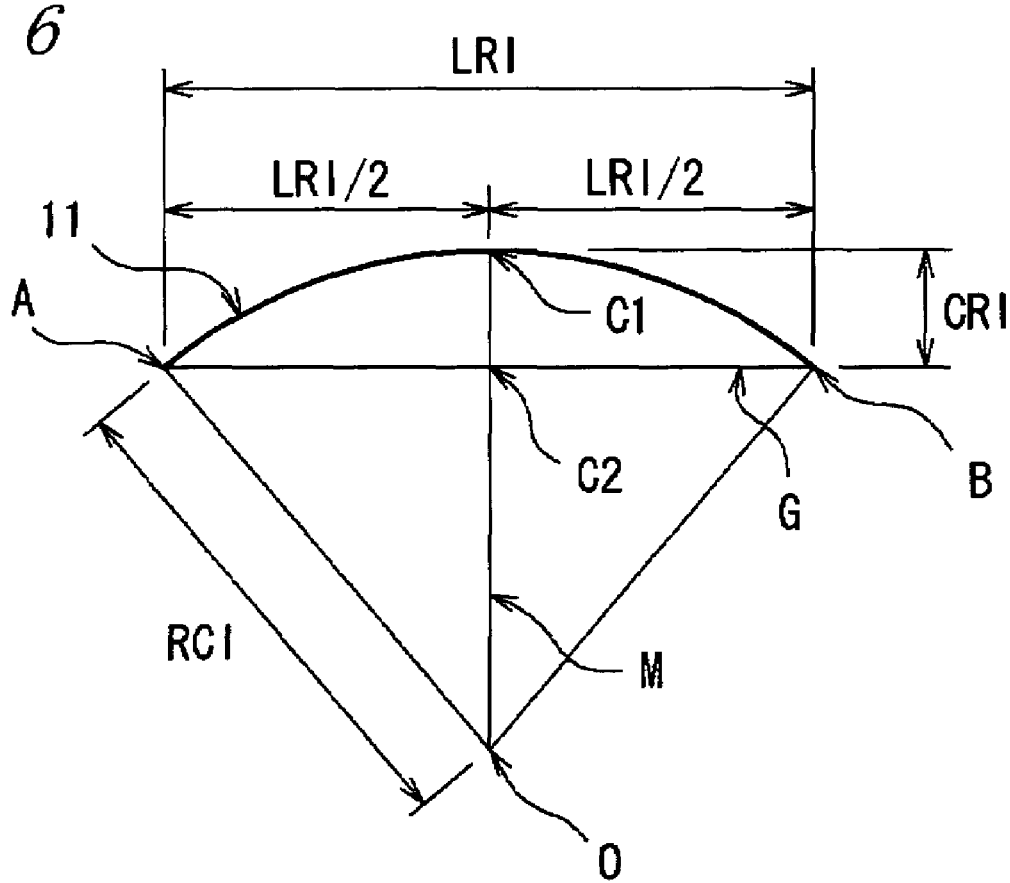
FIG. 6 is a diagram schematically showing the configuration of the crowning (full crowning) provided on a raceway of the inner ring.

On the other hand, FIG. 6 schematically shows a configuration of a section of a crowning formed between the end point A and the end point B of the raceway length LRI of the inner raceway 11 shown in FIG. 5. Referring to FIG. 6, the straight line M passing through the midpoint C2 of the chord G of the crowning with respect to the raceway length LRI and through the center point O of the crowning arc intersects perpendicularly to the chord G and passes through the center point C1 of the crowning arc with respect to the raceway length LRI.

The present inventors define the distance between the center point C1 of the crowning arc and the midpoint C2 of the chord thereof as the inner-ring crowning amount CRI. Provided that RCI denotes the radius of the crowning arc as shown in the figure, the inner-ring crowning amount CRI is determined based on the following equation (2):

$$CRI = RCI - \{RCI^2 - (LRI/2)^2\}^{1/2} \tag{2}$$

Figure 7:
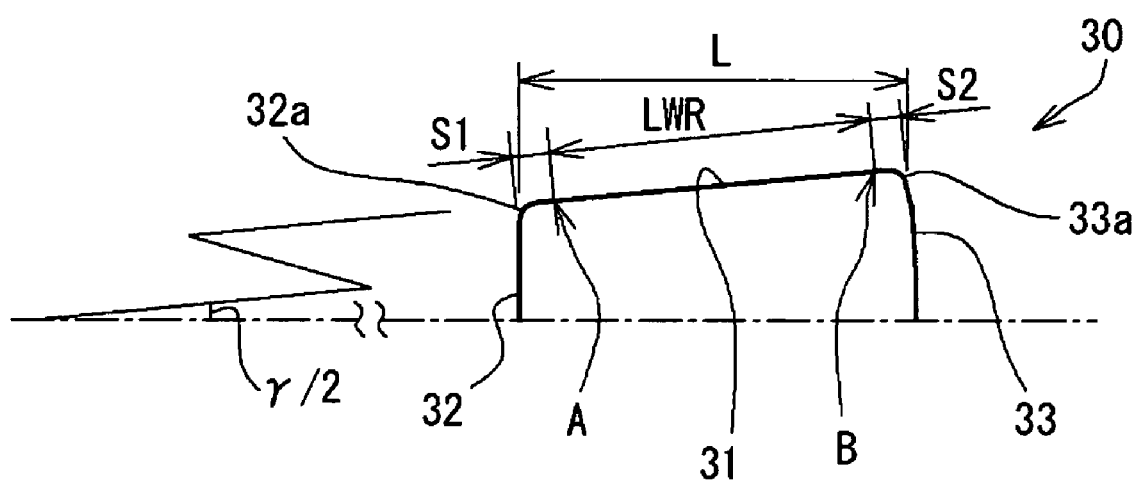
FIG. 7 is a diagram showing a contour of an upper half of a section of a tapered roller and a configuration of a crowning.
Figure 8:
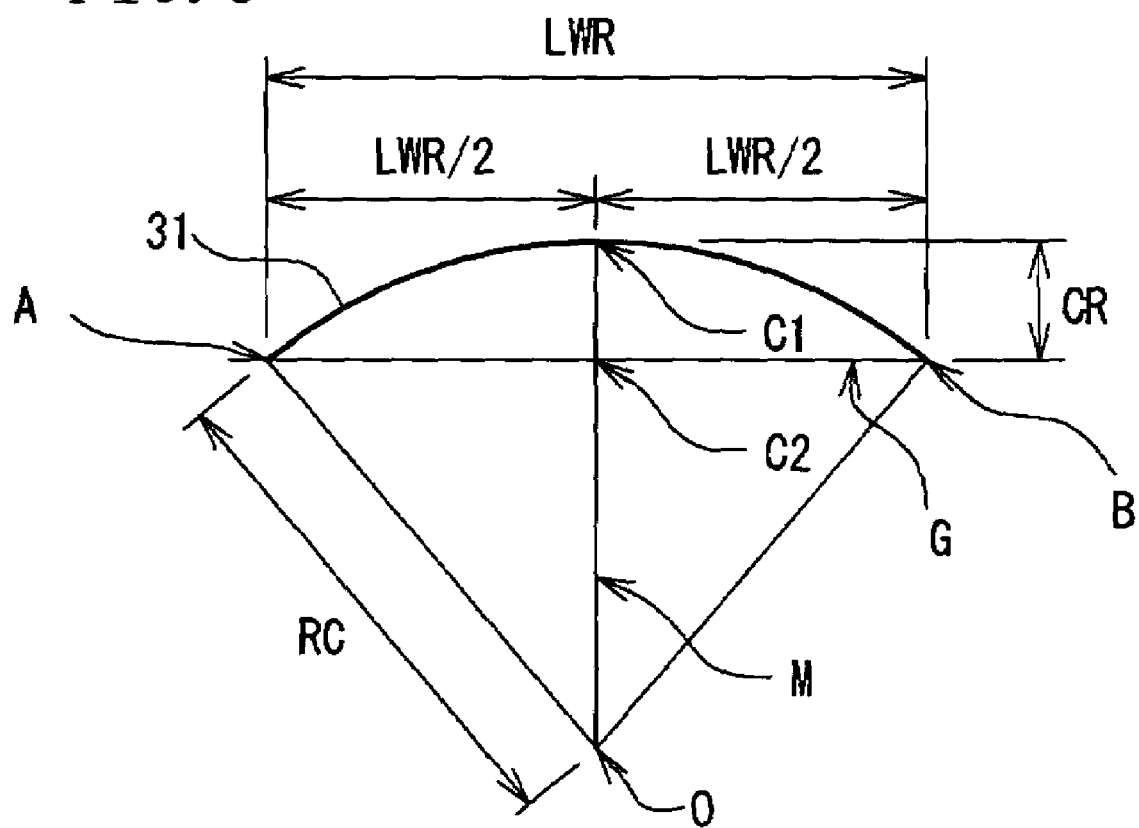
FIG. 8 is a diagram schematically showing the configuration of the crowning provided on a rolling contact surface of the tapered roller.

FIG. 7 shows a contour of an upper half of an axial section of the tapered roller 30. Referring to FIG. 7, the outer periphery of the tapered roller 30 is formed with the substantially linear rolling contact surface 31; and chamfered portions 32a, 33a smoothly extended downwardly from the axially opposite ends of the rolling contact surface 31. The chamfered portions 32a, 33a are also formed to smoothly continue into a small-diameter end face 32 and a great-diameter end face 33 of the tapered roller 30. The rolling contact surface 31, which appears to be a linear surface, is provided with a full crowning slightly protruded radially outwardly. FIG. 8 schematically shows only a configuration of the crowning formed between an end point A and an end point B of an effective length LWR of the rolling contact surface 31 shown in FIG. 7.

The present inventors define the quantity of the crowning on the tapered roller 30 (hereinafter, also referred to as roller crowning amount) to be the distance between a center point of a crowning arc defined by the effective roller length LWR of the rolling contact surface 31 and a chord of the crowning arc. A method of calculating the roller crowning amount is described as below.

Referring to FIG. 7, the aforesaid effective roller length LWR is determined based on the following equation (3):

$$LWR = L/\cos(\gamma/2) - (S1+S2) \tag{3},$$

where L denotes the width of the rolling contact surface 31 with respect to the central axis of the tapered roller 30; γ denotes the taper angle of the rolling contact surface 31; and S1, S2 denote the indicated dimensions of curved surfaces of the chamfered portions 32a, 33a formed at the opposite ends of the rolling contact surface 31.

The dimensions S1, S2 in the above equation (3) are set to given widths according to the size of the bearing.

Referring to FIG. 8, the straight line M passing through the midpoint C2 of the chord G of the crowning with respect to the effective roller length LWR and through the center point O of the crowning arc intersects perpendicularly to the chord G and passes through the center point C1 of the crowning arc with respect to the effective roller length LWR.

The present inventors define the distance between the center point C1 of the crowning arc and the midpoint C2 of the chord thereof as the roller crowning amount CR. Provided that RC denotes the radius of the crowning arc as shown in the figure, the roller crowning amount CR is determined based on the following equation (4):

$$CR = RC - \{RC^2 - (LWR/2)^2\}^{1/2} \tag{4}.$$

Figure 9:
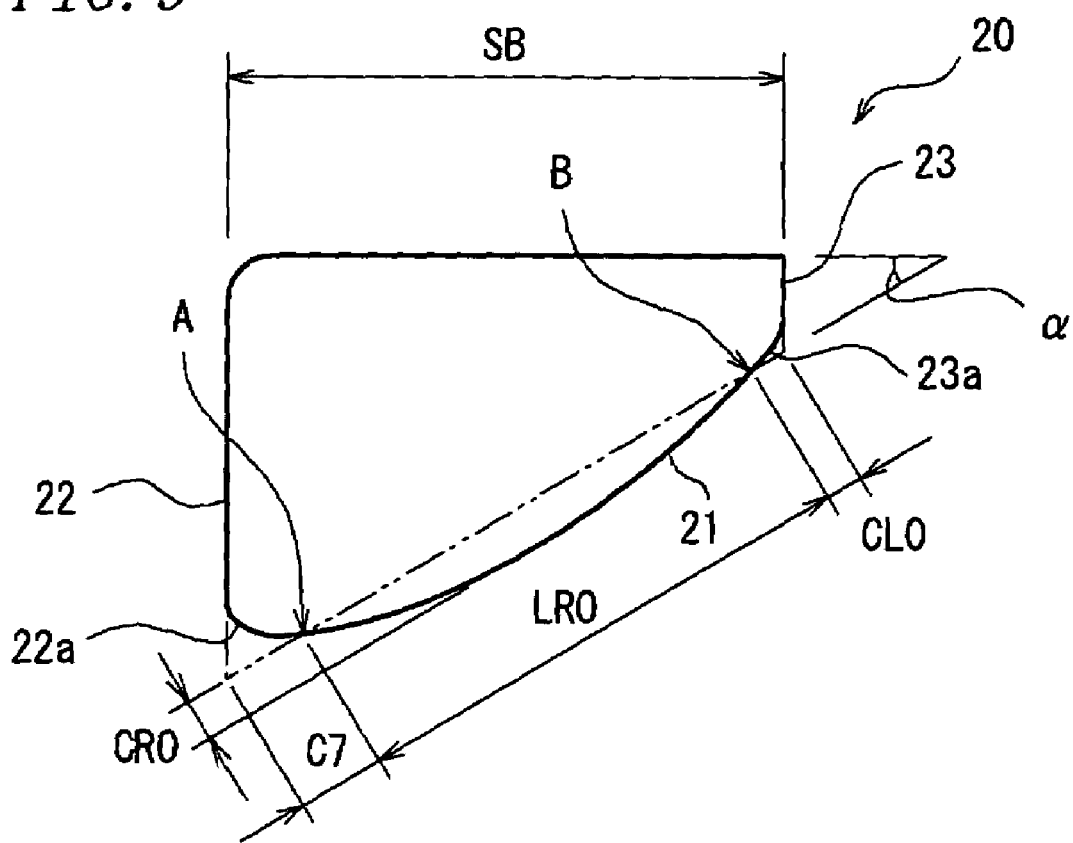
FIG. 9 is a diagram showing a contour of an outer ring and a configuration of a crowning.

Next, FIG. 9 depicts a contour of an axial section of the outer ring 20 having a full crowning provided on the outer raceway 21, the crowning shown in an exaggerated form. Referring to FIG. 9, the inner periphery of the outer ring 20 is formed with the outer raceway 21 in rolling contact with the rolling contact surface 31 of the tapered roller 30. The outer raceway 21 is provided with the full crowning protruded radially inwardly. The outer raceway 21 is formed with chamfered portions 22a, 23a which are extended from the opposite ends of the outer raceway to respective axial end faces of the outer ring 22. These chamfered portions 22a, 23a are formed to smoothly continue into a small-diameter end face 22 and a great-diameter end face 23 of the outer ring 20.

The present inventors define the quantity of the crowning of the outer ring 20 (hereinafter, also referred to as outer-ring crowning amount) to be the distance CRO between the center point of a crowning arc defined by a raceway length LRO of the outer raceway 21 and a chord of the crowning arc. A method of calculating the outer-ring crowning amount CRO is described as below.

Referring to FIG. 9, the aforesaid raceway length LRO is determined based on the following equation (5):

$$LRO = SB/\cos \alpha - (C7+CL0) \tag{5},$$

where SB denotes the width of the outer raceway 21 with respect to the axial direction of the outer ring 20; α denotes the taper angle of the outer raceway 21; and C7, CL0 denote the indicated dimensions of curved surfaces of the chamfered portions 22a, 23a formed at the opposite ends of the outer raceway 21.

The dimensions C7, CL0 in the above equation (5) are set to given widths according to the size of the bearing.

Figure 10:
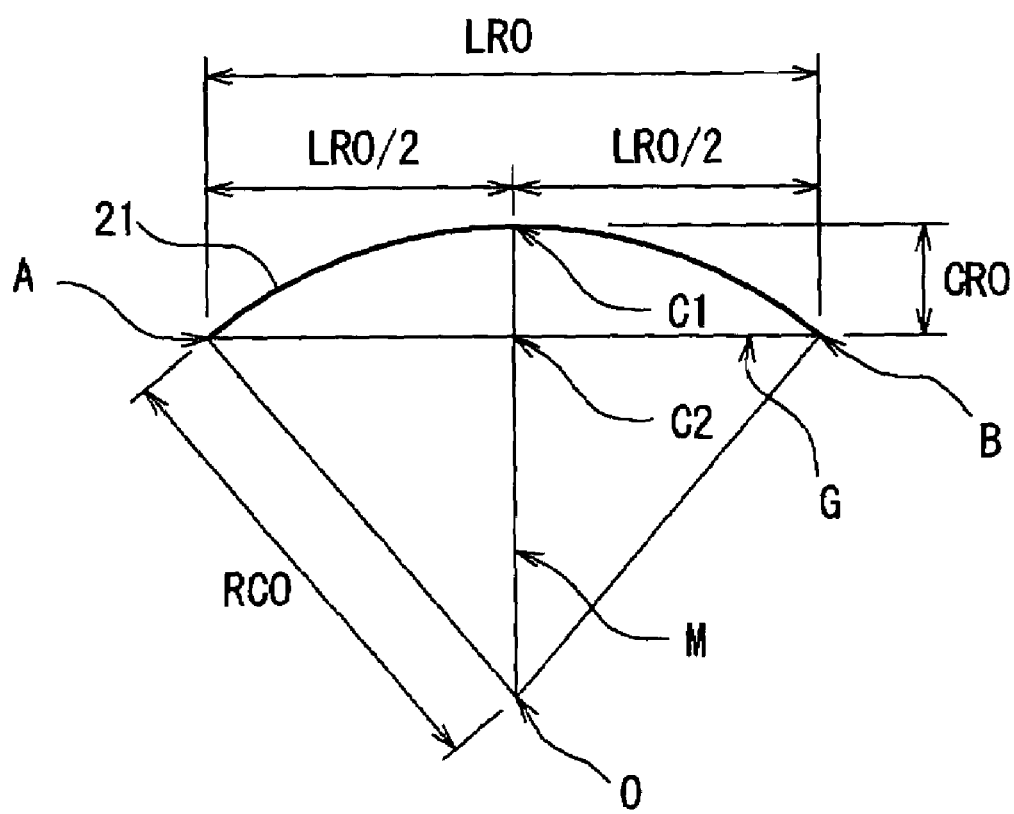
FIG. 10 is a diagram schematically showing the configuration of the crowning provided on a raceway of the outer ring.

On the other hand, FIG. 10 schematically shows a configuration of a section of the crowning formed between an end point A and an end point B of the raceway length LRO of the outer raceway 21 shown in FIG. 9. Referring to FIG. 10, a straight line M passing through the midpoint C2 of a chord G of the crowning with respect to the raceway length LRO and through the center point O of the crowning arc intersects perpendicularly to the chord G and passes through the center point C1 of the crowning arc with respect to the raceway length LRO.

The present inventors define the distance between the center point C1 of the crowning arc and the midpoint C2 of the chord thereof to be the outer-ring crowning amount CRO. Provided that RCO denotes the radius of the crowning arc shown in the figure, the outer-ring crowning amount CRO is determined based on the following equation (6):

$$CRO = RCO - \{RCO^2 - (LRO/2)^2\}^{1/2} \tag{6}.$$

In the aforementioned manners, the tapered roller and the inner and outer rings, each provided with the full crowning, may be determined for the crowning amounts.

It goes without saying that the crowning amounts of the tapered roller 30 and the inner and outer rings 10, 20, which are each provided with the full crowning, may be calculated based on the concept of the general crowning as described above. Specifically, the same method as that of determining the length LRI' in FIG. 3 may be taken to determine a length LWR' corresponding to the length LWR with respect to the tapered roller 30, or to determine a length LRO' corresponding to the length LRO with respect to the outer ring 20.

Subsequently, the respective center points of the individual arcs may be determined so as to determine the crowning amounts. The crowning amount thus determined based on the concept of the general crowning substantially coincides with the quantity determined based on the concept of the full crowning (FIG. 3, FIG. 4).

Next, the crowning radius RCO of the outer ring 20 and the raceway length LRO thereof determined in the aforementioned manner are used to define (RCO/LRO) as an outer-ring crowning parameter. On the other hand, the crowning radius RCI of the inner ring 10 and the raceway length LRI thereof are used to define (RCI/LRI) as an inner-ring crowning parameter.

The present inventors applied the aforementioned roller crowning amount, the inner-ring crowning amount and the outer-ring crowning amount to the following equations (7), (8), (9) and (10) for calculating a total crowning amount, an outer-ring crowning rate, a roller crowning rate and an inner-ring crowning rate.

(Total crowning amount)=(Outer-ring crowning amount)+(Inner-ring crowning amount)+(Roller crowning amount)×2 (7)

(Outer-ring crowning rate)=(Outer-ring crowning amount)/(Total crowning amount) (8)

(Roller crowning rate)=(Roller crowning amount×2)/(Total crowning amount) (9)

(Inner-ring crowning rate)=(Inner-ring crowning amount)/(Total crowning amount) (10)

Next, the present inventors experimentally measured the running torques of the tapered roller bearings according to the embodiments of the invention in order to investigate relations between the running torque and each of the above crowning parameters, between the running torque and the total crowning amount, and between the running torque and each of the crowning rates. The investigation results are described as below.

The following method was used for taking measurements of the rotational toque of the tapered roller bearing. A bearing testing machine, for example, was used, whereas a tapered roller bearing as an exemplary product of the invention was mounted in the testing machine. Subsequently, either one of the inner ring and the outer ring was rotated while measurement was taken on a running torque acting on the other one of the inner and outer rings. The test conditions are as follows. The tapered roller bearing (equivalent to JIS30306 bearing product) constituted as taught by the above embodiment was used, whereas a gear oil for differential gear assembly was used as the lubricating oil. An axial load of 4 kN was applied to the bearing as a pseudo preload. The bearing was rotated at two rotational speeds of 300[r/min] and 2000[r/min].

Lubrication conditions during the test are as follows. In the case of the rotational speed of 300[r/min], a suitable amount of lubricating oil at normal temperatures was only applied to the bearing prior to the test. While the test was conducted, the bearing was not subjected to the subsequent lubrication. In the case of the rotational speed of 2000[r/min], on the other hand, the test was conducted with a lubricating oil at a temperature of 323K (50° C.) circulatingly supplied at a rate of 0.5 litter per minute. The reason for adopting the method of changing the lubricating oil supplying method according to the rotational speed of the bearing is that the influence of the oil agitation loss, which results from an excessive supply of the lubricating oil, is minimized by supplying only the minimum required amount of lubricating oil with respect to each of the rotational speeds, thereby extracting the running torque based on rolling friction. The tapered roller bearings subjected to the test were exemplary products of the invention, which individually had the total crowning amounts and the respective crowning rates set to different values. Measurement was taken on the running torque of the respective test products so as to determine the respective relations of the running torque to the total crowning amount and to the respective crowning rates. Based on the relations thus determined, a numerical range for the reduction of the running torque was specified.

Figure 11:
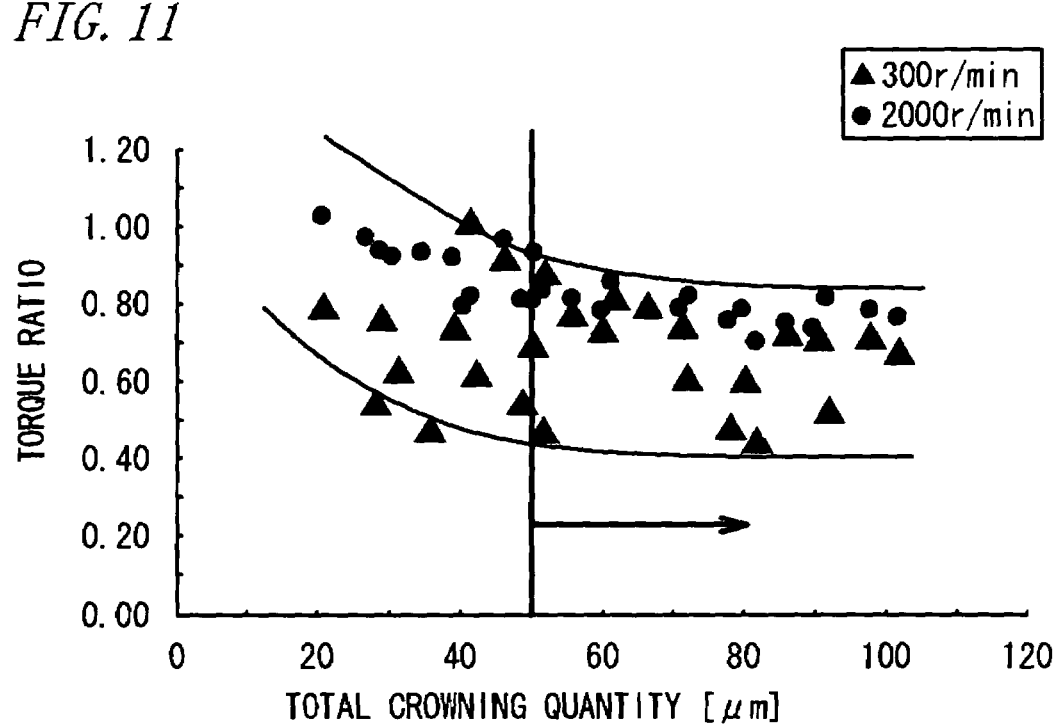
FIG. 11 is a scatter graph showing a relation between the total crowning amount and the torque ratio of a tapered roller bearing.

FIG. 11 is a scatter graph showing a relation between the total crowning amount and the torque ratio. (running torque/predetermined value) of the tapered roller bearing subjected to the measurement. As apparent from the graph, the torque ratios are scattered in a broad numerical range in the case of the total crowning amount of less than 50 μm. However, the graph indicates a tendency that with the increase of the total crowning amount, the maximum value of the scattered torque ratios is progressively decreased. In the case of the total crowning amount of 50 μm or more, the torque ratios are stably distributed in a range of lower values as compared with the case of the total crowning amount of less than 50 μm. If the total crowning amount exceeds 100 μm, the behavior of the rollers becomes instable so that the bearing is increased in the torque. Accordingly, the total crowning amount may preferably be 100 μm or less.

Figure 12:
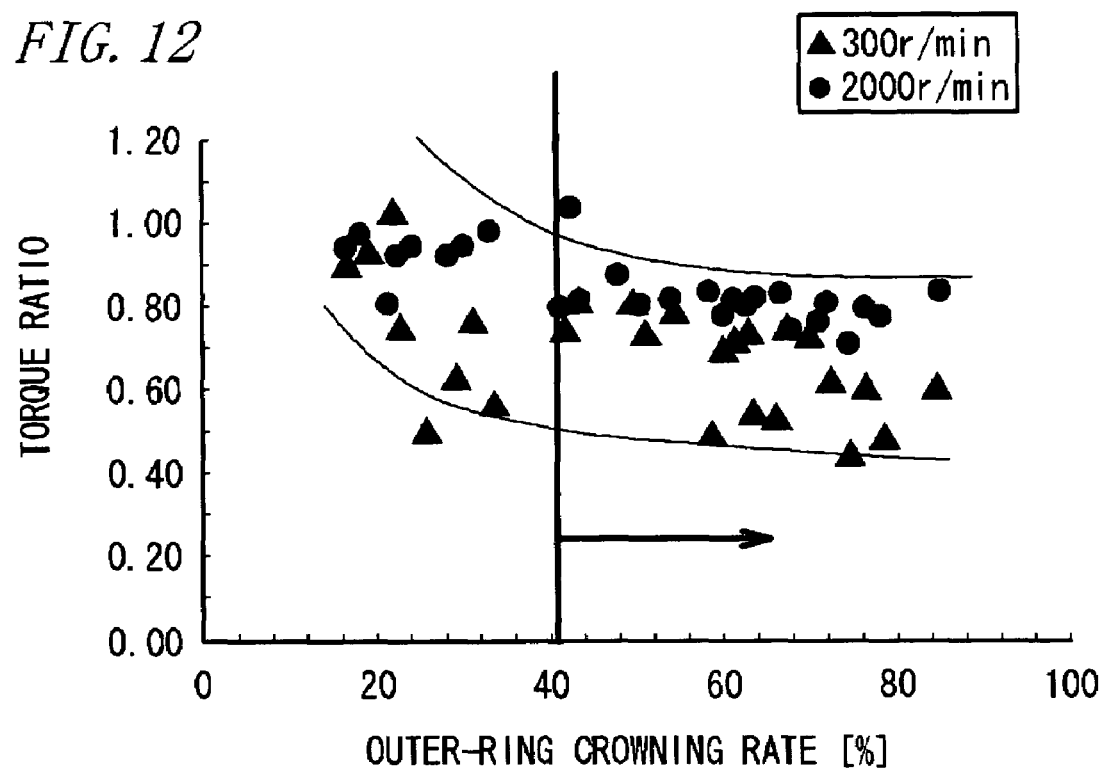
FIG. 12 is a scatter graph showing a relation between the outer-ring crowning rate and the torque ratio of the tapered roller bearing.

Next, FIG. 12 is a scatter graph showing a relation between the outer-ring crowning rate and the torque ratio of the tapered roller bearing. Apparently, the graph indicates a tendency that with the increase of the outer-ring crowning rate, the maximum value of the torque ratios is progressively decreased in the case of the outer-ring crowning rate of less than 40%. In the case of the outer-ring crowning rate of 40% or more, the torque ratios are stably distributed in a range of lower values as compared with the case of the outer-ring crowning rate of less than 40%. If the outer-ring crowning rate exceeds 85%, the bearing may be decreased in service life when edge load is applied between the inner ring and the rollers. Accordingly, the outer-ring crowning rate may preferably be 85% or less.

Figure 13:
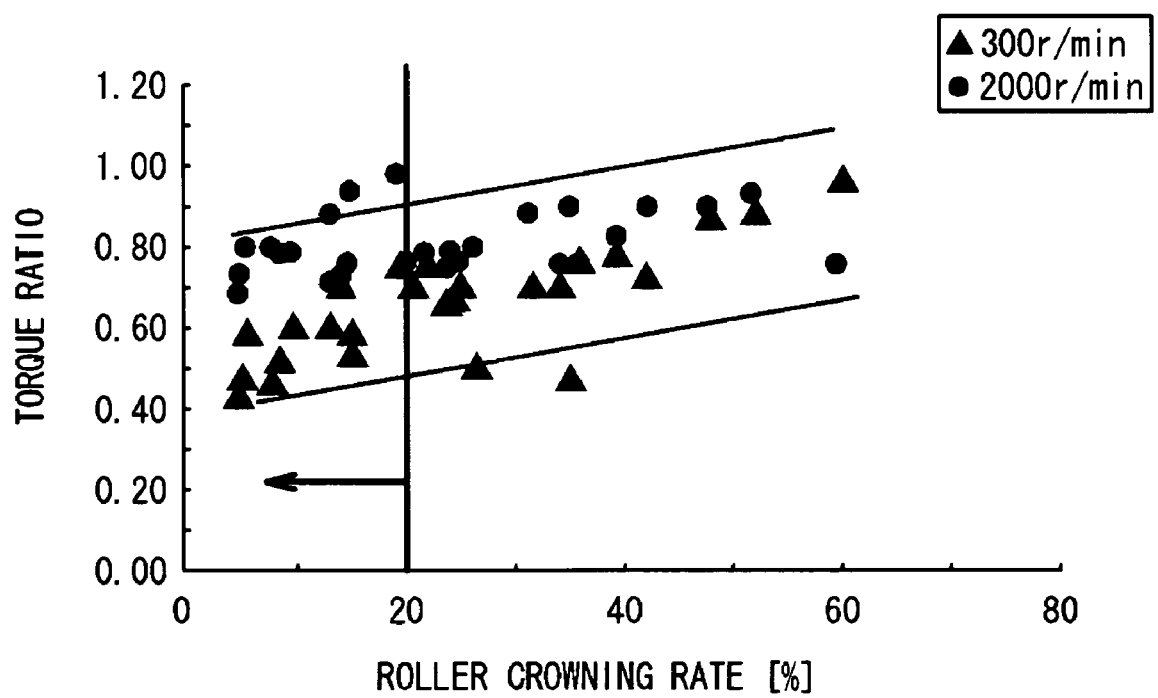
FIG. 13 is a scatter graph showing a relation between the roller crowning rate and the torque ratio of the tapered roller bearing.

FIG. 13 is a scatter graph showing a relation between the roller crowning rate and the torque ratio of the tapered roller bearing. Apparently, the graph indicates a tendency that with the decrease of the roller crowning rate, the maximum value of the torque values is progressively decreased in the case of the roller crowning rate of more than 20%. In the case of the roller crowning rate of 20% or less, the torque values are stably distributed in a range of lower values as compared with the case of the roller crowning rate of more than 20%. If the roller crowning rate is less than 5%, the bearing may sustain an increased torque due to the increase of the contact area, or the decreased service life due to the occurrence of the edge load. Accordingly, the roller crowning rate may preferably be 5% or more.

Figure 14:
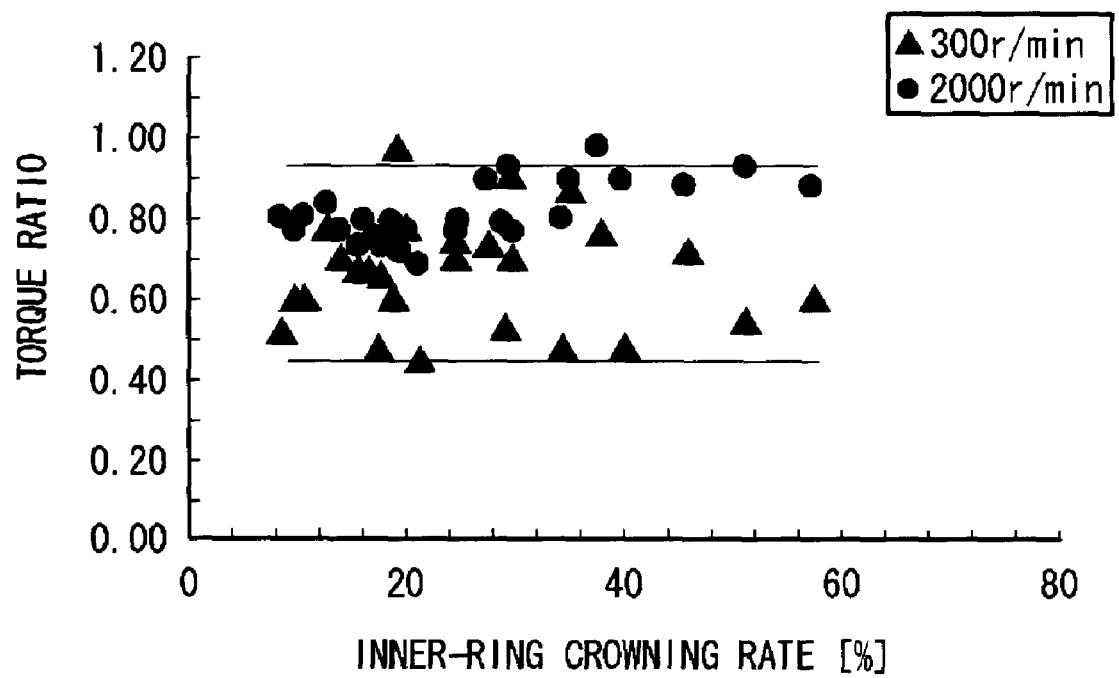
FIG. 14 is a scatter graph showing a relation between the inner-ring crowning rate and the torque ratio of the tapered roller bearing.

FIG. 14 is a scatter graph showing a relation between the inner-ring crowning rate and the torque ratio of the tapered roller bearing. As apparent from the graph, the torque ratios are stably distributed in a substantially constant range in spite of the variations of the inner-ring crowning rate. That is, a notable correlation between the inner-ring crowning rate and the torque ratio of the tapered roller bearing is not observed. It is noted however that the inner-ring crowning rate may be set to 10% or more whereby the contact load on the areas of the axially opposite ends of the contact surface between the inner raceway 11 and the rolling contact surface 31 may be reduced. Hence, even when the edge load is applied, the action thereof may be reduced so that the bearing is prevented from being decreased in the service life. If the inner-ring crowning rate exceeds 55%, the outer-ring crowning rate becomes small because the total crowning amount is fixed. This results in an increased torque. Accordingly, the inner-ring crowning rate may preferably be 55% or less.

As described above, the torque ratio of the tapered roller bearing or specifically, the relations of the running torque to the total crowning amount and to the respective crowning rates were investigated through experiments. Based on the experiment results, the inventors have obtained a finding that the running torque of the tapered roller bearing can be reduced by satisfying the conditions including a total crowning amount of 50 μm or more, an outer-ring crowning rate of 40% or more and a roller crowning rate of 20% or less.

Next, data on Examples 1, 2 of the tapered roller bearing (each including a head-side bearing and a tail-side bearing) and Comparative Example 1 (including a head-side bearing and a tail-side bearing) are listed in Table 1. The bearings have specifically set numerical values. As to the crowning, the bearing of Example 1 has the crowning amount and ratios set in the numerical ranges shown in the table, thus satisfying the aforementioned conditions (the total crowning amount of 50 μm or more, the outer-ring crowning rate of 40% or more, and the roller crowning rate of 20% or less). On the other hand, the bearing of Comparative Example 1 has the crowning amount and ratios set in such numerical ranges as not to satisfy these conditions. In addition, data on Example 3 and Comparative Example 2 of the head-side bearing as well as on Example 4 and Comparative Example 3 of the tail-side bearing are listed in Table 2. In Tables 1 and 2, the unit for the numerical values representing the lengths is millimeter.

In Tables 1 and 2, the bearing of Example 1 is provided with full crownings (the sectional shape of the raceway is defined only by an arc) on both of the inner ring and outer ring. In the other examples and comparative examples, only the outer ring is provided with the full crowning whereas the inner ring is provided with the composite crowning (the raceway has the substantially trapezoidal sectional shape having the arcuate upper side).

TABLE 1

|  | EXAMPLE 1 | | EXAMPLE 2 | | COMPARATIVE EXAMPLE 1 | |
| --- | --- | --- | --- | --- | --- | --- |
|  | HEAD SIDE | TAIL SIDE | HEAD SIDE | TAIL SIDE | HEAD SIDE | TAIL SIDE |
| BORE DIAMETER d [mm] | 45 | 40 | 45 | 40 | 45 | 40 |
| OUTSIDE DIAMETER D [mm] | 108 | 90 | 108 | 90 | 115 | 92 |
| ASSEMBLED BEARING WIDTH T [mm] | 32.5 | 25.25 | 32.5 | 25.25 | 45 | 32.75 |
| CONTACT ANGLE α [°] | 28.811 | 28.811 | 28.811 | 20 | 20 | 20 |
| ROLLER LOADING RATIO z · DW/(π · dm) | 0.87 | 0.74 | 0.91 | 0.91 | 0.88 | 0.85 |
| ROLLER-LENGTH/ROLLER-DIAMETER LWR/DW | 1.28 | 1.25 | 1.34 | 1.3 | 2.55 | 2.15 |
| ROLLER DIAMETER PARAMETER 2DW/(D − d) | 0.51 | 0.47 | 0.49 | 0.47 | 0.37 | 0.41 |
| OUTER-RING CROWNING PARAMETER RCO/LRO | 56 | 36 | 130 | 100 | 565 | 404 |
| INNER-RING CROWNING PARAMETER RCI/LRI | 92 | 62 | 254 | 179 | 761 | 516 |
| TOTAL CROWNING AMOUNT [mm] | 0.081 | 0.09 | 0.056 | 0.059 | 0.025 | 0.025 |
| OUTER-RING CROWNING RATE | 64% | 67% | 40% | 43% | 31% | 31% |
| INNER-RING CROWNING RATE | 31% | 29% | 53% | 51% | 44% | 45% |
| ROLLER CROWNING RATE | 5% | 4% | 7% | 7% | 24% | 24% |
| OUTER RACEWAY LENGTH LRO [mm] | 23.067 | 17.602 | 23.067 | 19.984 | 35.382 | 24.74 |
| INNER RACEWAY LENGTH LRI [mm] | 18.727 | 12.947 | 19.051 | 13.679 | 31.373 | 21.378 |
| EFFECTIVE ROLLER LENGTH LWR [mm] | 20.5 | 14.703 | 20.815 | 15.258 | 32.771 | 22.789 |
| OIL-INFLOW RESTRICTING MECHANISM (LABYRINGTH STRUCTURE) | PROVIDED | PROVIDED | PROVIDED | NOT PROVIDED | NOT PROVIDED | NOT PROVIDED |
| TYPE OF INNER-RING CROWNING | FULL | FULL | COMPOSITE | COMPOSITE | COMPOSITE | COMPOSITE |

TABLE 2

|  | EXAMPLE 3 HEAD SIDE | COMPARATIVE EXAMPLE 2 HEAD SIDE | EXAMPLE 4 TAILE SIDE | COMPARATIVE EXAMPLE 3 TAILE SIDE |
| --- | --- | --- | --- | --- |
| BORE DIAMETER d [mm] | 35 | 35 | 33.338 | 33.338 |
| OUTSIDE DIAMETER D [mm] | 89 | 89 | 68.263 | 68.263 |
| ASSEMBLED BEARING WIDTH T [mm] | 38 | 38 | 22.225 | 22.225 |
| CONTACT ANGLE α [°] | 25 | 22.5 | 25 | 20 |
| ROLLER LOADING RATIO z · DW/(π · dm) | 0.87 | 0.85 | 0.83 | 0.83 |
| ROLLER-LENGTH/ROLLER-DIAMETER LWR/DW | 1.67 | 2.38 | 1.48 | 2.07 |
| ROLLER DIAMETER PARAMETER 2DW/(D − d) | 0.46 | 0.41 | 0.44 | 0.42 |
| OUTER-RING CROWNING PARAMETER RCO/LRO | 88 | 247 | 147 | 342 |
| INNER-RING CROWNING PARAMETER RCI/LRI | 114 | 608 | 238 | 330 |
| TOTAL CROWNING AMOUNT [mm] | 0.066 | 0.031 | 0.027 | 0.023 |
| OUTER-RING CROWNING RATE | 48% | 46% | 43% | 27% |
| INNER-RING CROWNING RATE | 45% | 35% | 41% | 47% |
| ROLLER CROWNING RATE | 6% | 19% | 15% | 26% |
| OUTER RACEWAY LENGTH LRO [mm] | 22.694 | 28.366 | 13.58 | 16.984 |
| INNER RACEWAY LENGTH LRI [mm] | 19.048 | 25.049 | 10.128 | 13.833 |
| EFFECTIVE ROLLER LENGTH LWR [mm] | 20.511 | 26.263 | 11.499 | 15.128 |

TABLE 2-continued

|  | EXAMPLE 3 HEAD SIDE | COMPARATIVE EXAMPLE 2 HEAD SIDE | EXAMPLE 4 TAILE SIDE | COMPARATIVE EXAMPLE 3 TAILE SIDE |
|---|---|---|---|---|
| OIL-INFLOW RESTRICTING MECHANISM (LABYRINGTH STRUCTURE) | PROVIDED | NOT PROVIDED | NOT PROVIDED | NOT PROVIDED |
| TYPE OF INNER-RING CROWNING COMPOSITE | COMPOSITE | COMPOSITE | COMPOSITE |  |

Figure 15:
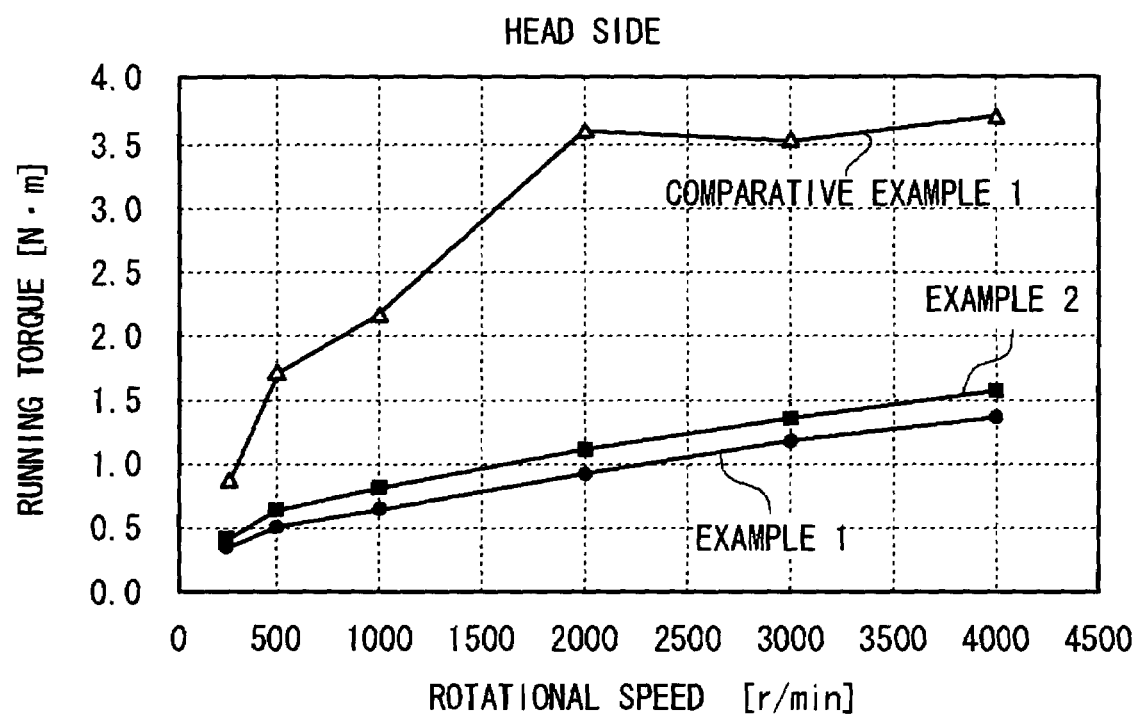
FIG. 15 is a graph showing the variations of running torque against the rotational speed on a head side (Examples 1, 2 and Comparative Example 1)
Figure 16:
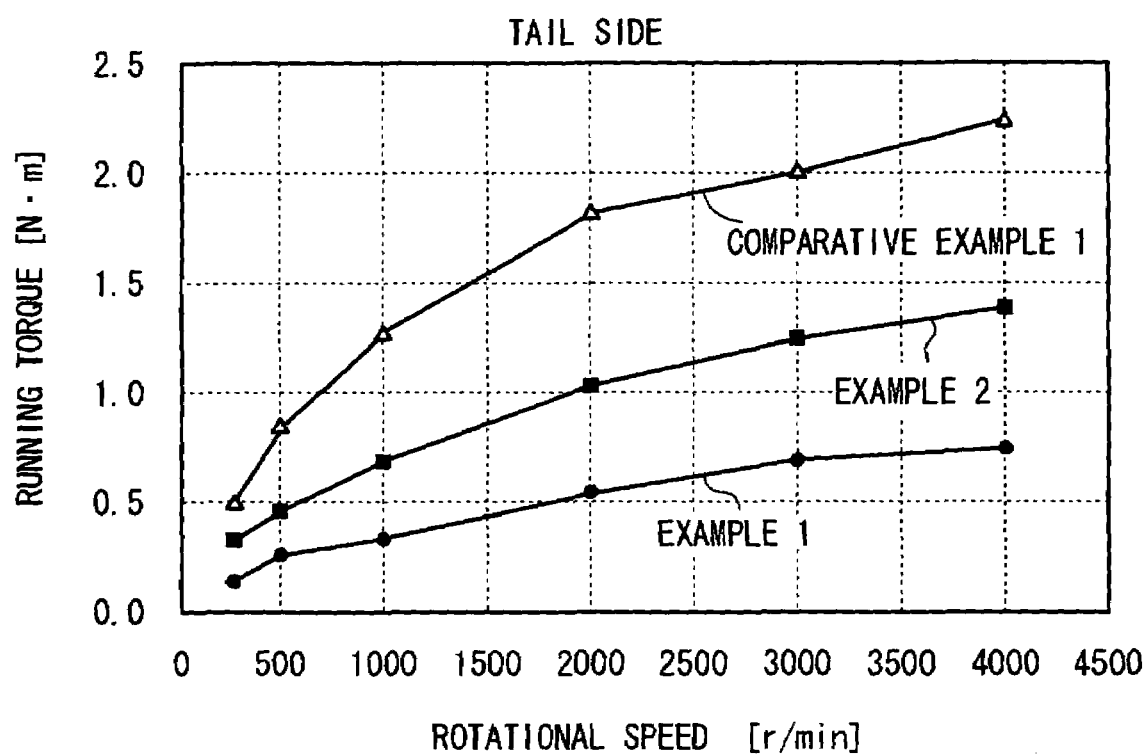
FIG. 16 is a graph showing the variations of running torque against the rotational speed on a tail side (Examples 1, 2 and Comparative Example 1)

Measurements were taken on the running torque of the bearings of Examples 1, 2 and Comparative Example 1 shown in Table 1. The results are shown in FIG. 15 and FIG. 16. FIG. 15 is a graph showing the results of the head-side tapered roller bearings, whereas FIG. 16 is a graph showing the results of the tail-side tapered roller bearings. The running torque was measured under the conditions including an axial load of 4 kN; rotational speeds of 250 to 4000[r/min]; a lubricating oil of gear oil 75W-90; and an oil temperature of 50° C. The lubricating oil was supplied in such an amount to completely fill the back side of the bearing.

Measurements were taken on the running torque of the bearings of Example 3 and Comparative Example 2 shown in Table 2. The results are shown in FIG. 17.

Measurements were taken on the running torque of the bearings of Example 4 and Comparative Example 3 shown in Table 2. The results are shown in FIG. 18.

As seen from FIG. 15 and FIG. 16, Examples 1, 2, as contrasted with Comparative Example 1, achieve notable reductions of the head-side running torque across the rotational speed range of 250 to 4000[r/min]. In respect of the tail-side running torque, Examples 1, 2 also achieve greater reductions than Comparative Example 1. Particularly, Example 1 provided with the oil inflow restricting mechanism dramatically reduces the running torque.

Figure 17:
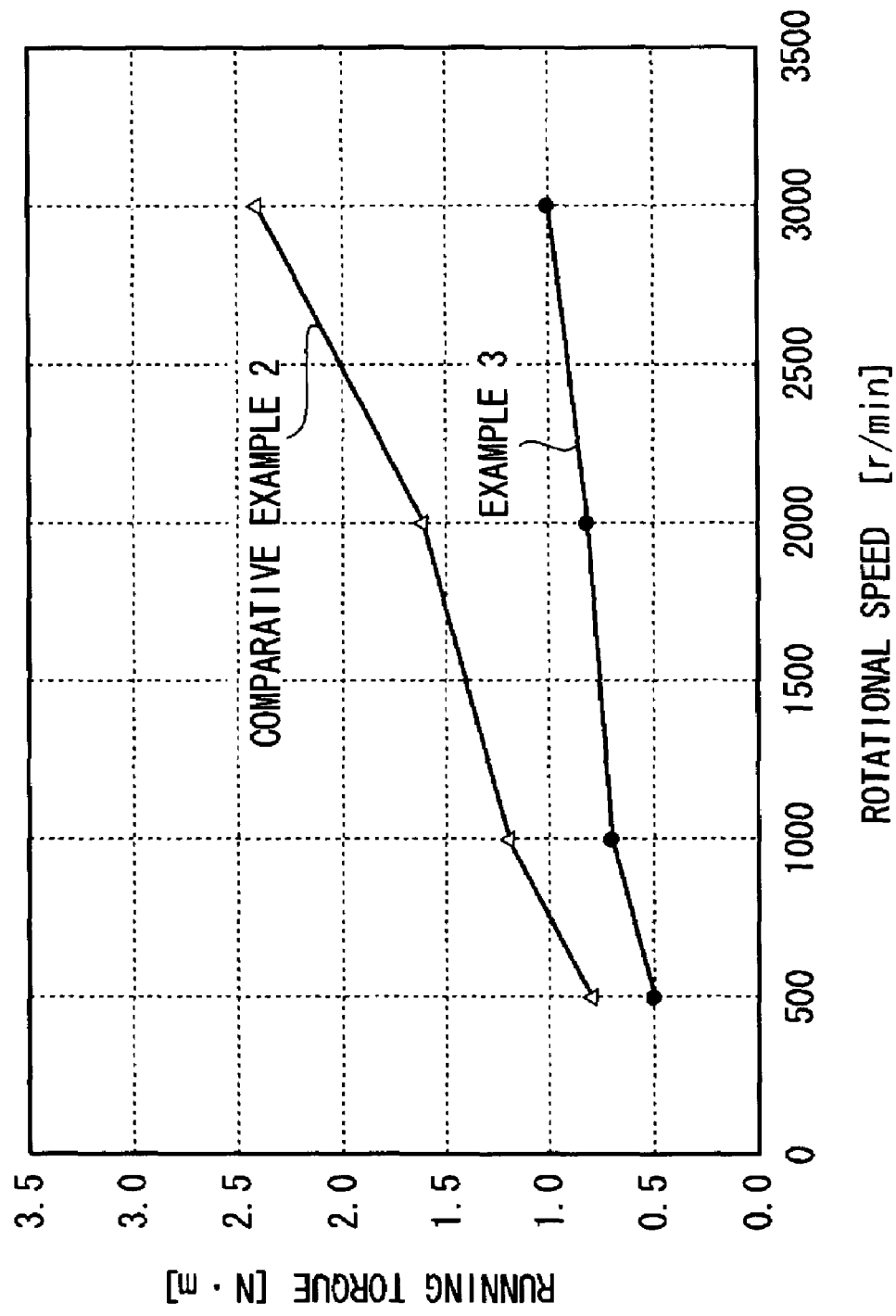
FIG. 17 is a graph showing the variations of running torque against the rotational speed (Example 3 and Comparative Example 2)

In FIG. 17, as well, Example 3 achieve a much greater reduction of the head-side running torque than Comparative Example 2 across the rotational speed range of 250 to 3000 [r/min].

Figure 18:
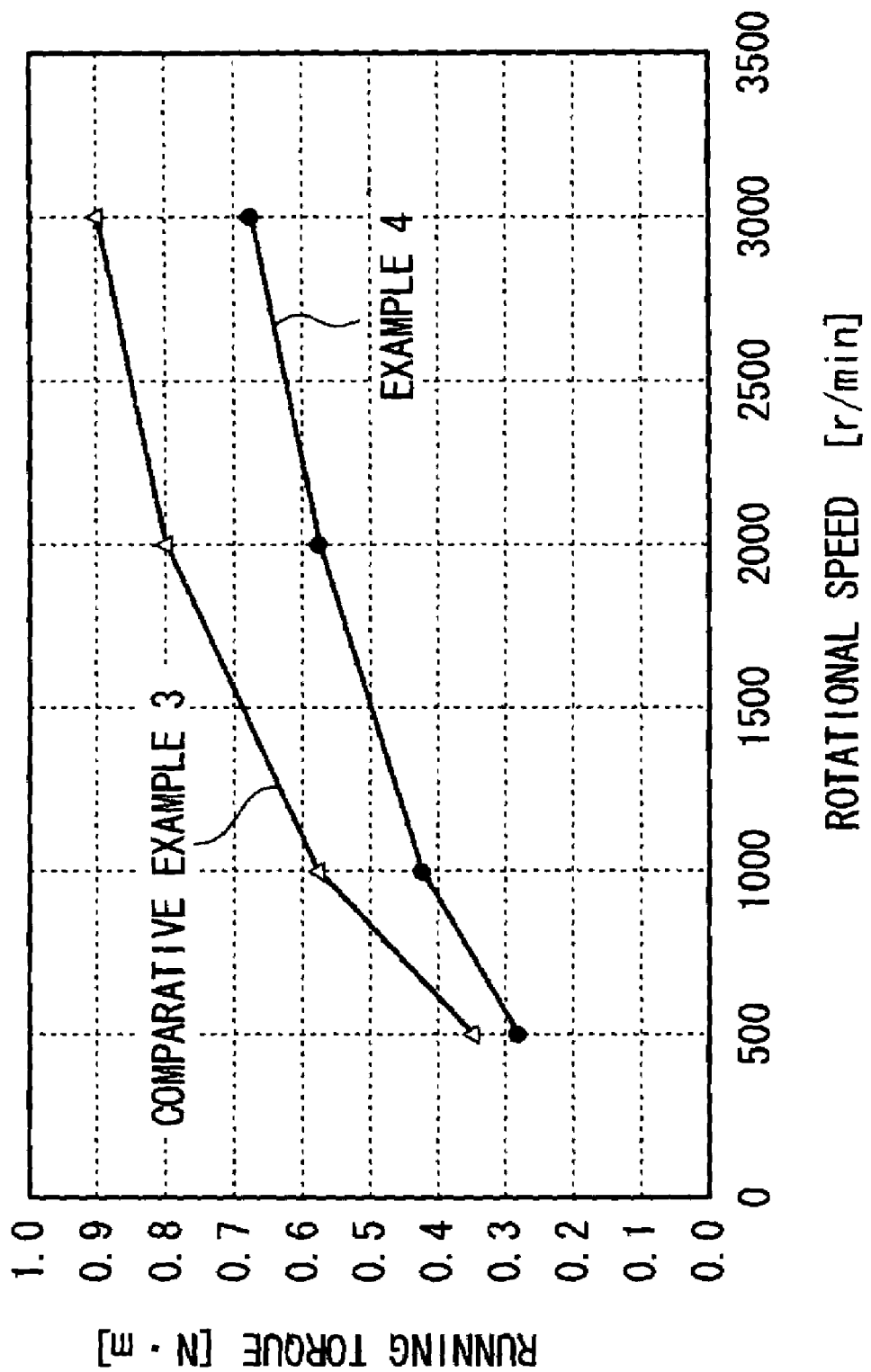
FIG. 18 is a graph showing the variations of running torque against the rotational speed (Example 4 and Comparative Example 3)

FIG. 18 also indicates that Example 4 achieve a much greater reduction of the tail-side running torque than Comparative Example 3 across the rotational speed range of 500 to 3000[r/min].

As described above, all the Examples 1 to 4 achieve the greater reduction of running torque than the comparative examples. In respect of some of the items listed in Table 1 and Table 2, a comparison of the numerical range is made between the examples and the comparative examples. The results are listed in the following Table 3.

ference between the examples and the comparative examples is obvious in respect of the roller-length/diameter ratio, the outer-ring crowning parameter and the inner-ring crowning parameter, which are apparently predominant factors of the reduction of running torque. It is understood that the rolling viscous resistance may be reduced by setting the crowning parameters of the above factors to some values in the above numerical ranges. Accordingly, the rolling viscous resistance may be reduced by defining the crowning based on a different viewpoint from the aforementioned approach to specify the total crowning amount, the outer-ring crowning rate and the roller crowning rate. That is, the rolling viscous resistance may be reduced by defining the crowning based on the outer-ring crowning parameter and the inner-ring crowning parameter, whereby the reduction of the running torque may be achieved.

It is noted however that the aforesaid numerical ranges of the above crowning parameters should take into account some plus or minus error margin or the numerical differences from those of the comparative example. For achieving the reduction of the running torque, the outer-ring crowning parameter (RCO/LRO) should be set to a value in the range of 30 to 150, whereas the inner-ring crowning parameter (RCI/LRI) should be set to a value in the range of 50 to 260.

As to the roller loading rates listed in Table 3, the numerical range of the examples include the numerical range of the comparative examples. That is, the examples exhibit no significant difference from the comparative examples in this respect. However, it is obvious that the increase of the roller loading ratio generally results in the increase of the running torque. Because of the relation with the load carrying capacity, the roller loading ratio may not be simply reduced. The roller loading ratio is closely related with the roller-length/diameter ratio. Therefore, what produces the effect to reduce the running torque (attributable to the oil agitation loss and the rolling viscous resistance) is to reduce the roller-length/diameter ratio while maintaining the roller loading ratio as small as possible.

TABLE 3

|  | EXAMPLES 1~4 | COMPARATIVE EXAMPLES 1, 2, 3 |
|---|---|---|
| ROLLER LOADING RATIO z · DW/(π · dm) | 0.74~0.91 | 0.83~0.88 |
| ROLLER-LENGTH/ROLLER-DIAMETER LWR/DW | 1.25~1.67 | 2.07~2.55 |
| ROLLER DIAMETER PARAMETER 2DW/(D − d) | 0.44~0.51 | 0.37~0.42 |
| OUTER-RING CROWNING PARAMETER RCO/LRO | 36~147 | 177~565 |
| INNER-RING CROWNING PARAMETER RCI/LRI | 62~254 | 330~761 |

As apparent from Table 3, there are significant numerical differences between the examples and the comparative examples in respect of the roller-length/diameter ratio, the roller-diameter parameter, the outer-ring crowning parameter and the inner-ring crowning parameter. Particularly, the dif- Specifically, the roller loading ratio (z·DW/(π·dm)) may preferably be in the range of 0.7 to 0.92, which includes the numerical range of the examples shown in Table 3. The reason for defining the lower limit to be 0.7 is that if the roller loading ratio is less than 0.7, the bearing suffers insufficient load carrying capacity or rigidity. The reason for defining the upper limit to be 0.92 is that if the roller loading ratio exceeds 0.92, the bearing is decreased in the oil discharging effect due to an insufficient pumping action, so that the oil agitation loss and the rolling viscous resistance are not fully reduced.

The roller-length/roller-diameter ratio (LWR/DW) may preferably be in the range of 1.1 to 1.7, which includes the numerical range of the examples shown in Table 3. The reason for defining the lower limit to be 1.1 is that if the roller-length/roller-diameter ratio is less than 1.1, the roller diameter is so great that the rolling viscous resistance is increased. The reason for defining the upper limit to be 1.7 is that if the roller-length/roller-diameter ratio exceeds 1.7, the roller diameter is so small that the load carrying capacity is decreased.

On the other hand, the roller diameter parameter (2DW/(D−d)) may preferably be in the range of 0.44 to 0.52, which includes the numerical range of the examples shown in Table 3. The reason for defining the lower limit to be 0.44 is that if the parameter is less than 0.44, a free space within the bearing has such a small volume that the oil flow is slowed. Hence, the bearing fails to achieve a sufficient effect to reduce the oil agitation loss. The reason for defining the upper limit to be 0.52 is that if the parameter exceeds 0.52, the roller diameter is too great relative to the bearing size (diameters of the inner and outer rings) so that the configuration of the whole body of the bearing lacks in balance. This makes it difficult to apply the bearing to common machines.

Examples 1 and 2 satisfying the aforementioned conditions determined based on the scatter graphs (FIG. 11 to FIG. 14) (the total crowning amount of 50 µm or more, the outer-ring crowning rate of 40% or more and the roller crowning rate of 20% or less) have obvious differences from Comparative Example 1 in respect of the running torques shown in FIG. 15 and FIG. 16. This also demonstrates the fact that the reduction of the running torque may be achieved by satisfying the above conditions.

The restriction of the oil inflow by means of the labyrinth seal is also thought to contribute to the reduction of the running torque. The outer ring is designed to have a great contact angle α of 28.811° such as to promote the oil discharge. This is also thought to produce the effect to reduce the running torque. The outer ring may have the contact angle α in the range of 25° to 30° such as to provide a similar effect.

The invention claimed is:

1. A tapered roller bearing comprising: an outer ring; an inner ring; a plurality of tapered rollers interposed between these rings; and a retainer for retaining the tapered rollers, wherein
a roller loading ratio represented by z·DW/(π·dm) is in a range of 0.7 to 0.92, and a ratio of roller length to roller diameter as represented by LWR/DW is in a range of 1.1 to 1.7, provided that z denotes a number of rollers, LWR denotes an effective length of the roller, DW denotes a mean diameter of the roller and dm denotes the Pitch Circle Diameter (PCD) of a roller, and wherein
an outer-ring crowning parameter (=RCO/LRO) is in a range of 30 to 150, and an inner-ring crowning parameter (=RCI/LRI) is in a range of 50 to 260, provided that RCO denotes a radius of an outer-ring crowning, LRO denotes a raceway length of the outer ring, RCI denotes a radius of an inner-ring crowning, and LRI denotes a raceway length of the inner ring.

2. A tapered roller bearing according to claim 1, wherein a roller diameter parameter (2DW/(D-d)) is in a range of 0.44 to 0.52, provided that d denotes a bore diameter of the inner ring, D denotes the outside diameter of an outer ring.

3. A tapered roller bearing assembly comprising oil inflow restricting means for restricting the inflow of oil, the restricting means being disposed at an axial one end of space between the inner ring and the outer ring of the tapered roller bearing according to claim 1.

4. A tapered roller bearing assembly according to claim 3, wherein the oil inflow restricting means comprises a labyrinth seal defined between the inner ring and an annular portion which is formed at an end of a small diameter portion of the retainer as extended radially inwardly from place adjacent to the outer ring and which adjoins the inner ring at an inside circumferential end thereof.

5. A tapered roller bearing according to claim 1, wherein the outer ring has a contact angle in a range of 25° to 30°.

6. A tapered roller bearing according to claim 1, wherein an inner-ring crowning rate (=the inner-ring crowning amount/the total crowning amount) is 10% or more.

7. A tapered roller bearing comprising: an outer ring; an inner ring; a plurality of tapered rollers interposed between these rings; and a retainer for retaining the tapered rollers, wherein
a roller loading ratio represented by z·DW/(π·dm) is in a range of 0.7 to 0.92, and a ratio of roller length to roller diameter as represented by LWR/DW is in a range of 1.1 to 1.7, provided that z denotes a number of rollers, LWR denotes an effective length of the roller, DW denotes a mean diameter of the roller, and dm denotes a Pitch Circle Diameter (PCD) of the roller, and wherein
raceways of the outer ring and the inner ring and a rolling contact surface of the tapered roller are each provided with a crowning;
a total crowning amount (=an outer-ring crowning amount+an inner-ring crowning amount+a roller crowning amount) is 50 µm or more;
an outer-ring crowning rate (=the outer-ring crowning amount/the total crowning amount) is 40% or more; and
a roller crowning rate (=(the roller crowning amount×2)/the total crowning amount) is 20% or less.

8. A tapered roller bearing according to claim 7, wherein a roller diameter parameter (2DW/(D-d)) is in a range of 0.44 to 0.52, provided that d denotes a bore diameter of the inner ring, D denotes the outside diameter of an outer ring.

9. A tapered roller bearing assembly comprising oil inflow restricting means for restricting the inflow of oil, the restricting means being disposed at an axial one end of space between the inner ring and the outer ring of the tapered roller bearing according to claim 7.

10. A tapered roller bearing according to claim 7, wherein the outer ring has a contact angle in a range of 25° to 30°.

11. A tapered roller bearing according to claim 7, wherein an inner-ring crowning rate (=the inner-ring crowning amount/the total crowning amount) is 10% or more.

12. A vehicular pinion-shaft supporting apparatus comprising tapered roller bearings disposed on a pinion-gear side of a pinion-shaft and on an end of the pinion shaft opposite the pinion-gear end, wherein a tapered roller bearing disposed on the pinion-gear side includes:
an inner ring;
an inner ring;
a plurality of tapered rollers interposed between these rings; and
a retainer for retaining the tapered rollers; and
oil inflow restricting means for restricting the inflow of oil, the restricting means being disposed at an axial one end of space between the inner ring and the outer ring, wherein a roller loading ratio represented by $z \cdot DW/(\pi \cdot dm)$ is in a range of 0.7 to 0.92, and a ratio of roller length to roller diameter as represented by LWR/DW is in a range of 1.1 to 1.7, provided that z denotes a number of rollers, LWR denotes an effective length of the roller, DW denotes a mean diameter of the roller and dm denotes the Pitch Circle Diameter (PCD) of a roller, and an outer-ring crowning parameter (=RCO/LRO) is in a range of 30 to 150, and an inner-ring crowning parameter (=RCI/LRI) is in a range of 50 to 260, provided that RCO denotes a radius of an outer-ring crowning, LRO denotes a raceway length of the outer ring, RCI denotes a radius of an inner-ring crowning, and LRI denotes a raceway length of the inner ring.

13. The vehicular pinion-shaft supporting apparatus according to claim 12, wherein the oil inflow restricting means comprises a labyrinth seal defined between the inner ring and an annular portion which is formed at an end of a small diameter portion of the retainer as extended radially inwardly from place adjacent to the outer ring and which adjoins the inner ring at an inside circumferential end thereof.

* * * * *